(12) United States Patent
Hara

(10) Patent No.: US 10,998,828 B2
(45) Date of Patent: May 4, 2021

(54) INSULATION-TYPE DC/DC CONVERTER, AC/DC CONVERTER, POWER ADAPTER AND ELECTRICAL APPARATUS FOR ENHANCING SYNCHRONIZATION BETWEEN PRIMARY SIDE AND SECONDARY SIDE

(71) Applicant: Rohm Co., Ltd., Kyoto (JP)

(72) Inventor: Hideo Hara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/688,624

(22) Filed: Nov. 19, 2019

(65) Prior Publication Data
US 2020/0169179 A1 May 28, 2020

(30) Foreign Application Priority Data
Nov. 22, 2018 (JP) .............................. JP2018-219353

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01); *H02M 3/33507* (2013.01); *H02M 3/33523* (2013.01); *H02M 3/33546* (2013.01)

(58) Field of Classification Search
CPC ............... H02M 1/08; H02M 3/33592; H02M 3/33507; H02M 3/33523; H02M 3/33546
See application file for complete search history.

(56) References Cited

U.S. PATENT DOCUMENTS

| | | | | |
|---|---|---|---|---|
| 6,671,193 | B1* | 12/2003 | Pelkonen | H02M 3/33592 363/53 |
| 10,516,340 | B1* | 12/2019 | Malinin | H02M 1/083 |
| 10,658,937 | B1* | 5/2020 | Zafarana | H02M 3/33592 |
| 2011/0305043 | A1* | 12/2011 | Matsumoto | H02M 3/33592 363/21.01 |

(Continued)

FOREIGN PATENT DOCUMENTS

JP 2006-197688 7/2006

*Primary Examiner* — Jeffrey A Gblende
*Assistant Examiner* — Lakaisha Jackson
(74) *Attorney, Agent, or Firm* — Fish & Richardson P.C.

(57) ABSTRACT

The task of the present invention is to enhance safety of an insulation-type DC/DC converter.
The present invention relates to an insulation-type DC/DC converter, an AC/DC converter, a power adapter and an electronic device. A switch transistor is disposed on a primary side of a transformer, and a synchronous rectification transistor is disposed on a secondary side of the transformer. A primary-side control portion performs switch-driving of the switch transistor, and a secondary-side control portion controls turn-on and turn-off of the synchronous rectification transistor. A pulse transformer portion for implementing bi-directional communication between the primary-side control portion and the secondary-side control portion is disposed between the primary side and the secondary side. For example, signals associated with turn-on and turn-off of the switch transistor are transceived between the primary-side control portion and the secondary-side control portion by a pulse transformer portion.

11 Claims, 12 Drawing Sheets

(56) References Cited

U.S. PATENT DOCUMENTS

2012/0081927 A1* 4/2012 Matsumoto ....... H02M 3/33523
                                                363/21.05
2017/0126133 A1* 5/2017 Yang ................. H02M 3/33592
2018/0351462 A1* 12/2018 Li ..................... H02M 3/33592
2019/0123655 A1* 4/2019 Hirose .............. H02M 3/33592

* cited by examiner

Handshake communication HS1

Handshake communication HS2

INSULATION-TYPE DC/DC CONVERTER, AC/DC CONVERTER, POWER ADAPTER AND ELECTRICAL APPARATUS FOR ENHANCING SYNCHRONIZATION BETWEEN PRIMARY SIDE AND SECONDARY SIDE

BACKGROUND OF THE INVENTION

Field of the Invention

The present invention relates to a direct-current/direct-current (DC/DC) converter, an alternating-current/direct-current (AC/DC) converter, a power adapter and an electronic device.

Description of the Prior Art

In an insulation-type direct-current/direct-current (DC/DC) converter using a transformer, a feedback signal corresponding to a secondary-side voltage is transmitted to a primary side by such an optocoupler, and switch-driving of a switch transistor connected to a primary-side winding of a transformer is performed, thereby achieving stabilization of the secondary-side voltage.

Prior Art Document

Patent Publication
Patent publication 1: Japan Patent Publication No. 2006-197688

SUMMARY OF THE INVENTION

Problems to be Solved by the Invention

In this type of insulation-type DC/DC converter, information of a secondary-side voltage is unidirectionally transmitted to a primary side, and a primary-side circuit has no way of learning other information in a secondary-side circuit, and the secondary-side circuit likewise has no way of learning information in the primary-side circuit. Thus, even if issues are occurred in the secondary-side circuit, the primary-side circuit would still continue to drive a switch transistor; similarly, even if issues are occurred in the primary-side circuit, the secondary-side circuit would still continue to perform actions in the secondary-side circuit (for example, controlling turn-on and turn-off of a synchronous rectification transistor). Although a structure, which a DC/DC converter can be safely inactivated in the event of the above situations, may be assembled in most cases, the issues mentioned above may aggravate due to a lengthy period needed before the DC/DC converter is inactivated.

Further, when synchronous rectification is performed by a synchronous rectification transistor disposed on a primary side, control of time points for turn-on and turn-off of the synchronous rectification transistor becomes critical. The switch transistor of the primary side and the synchronous rectification transistor of the secondary-side should be prevented from being turned on simultaneously, so as to prevent system damage. In regard to the aspect mentioned above, there is a method in which information of the primary side is inferred at the secondary side by monitoring the voltage in a secondary-side winding of the transformer, so as to control the synchronous rectification transistor. However, there is still a need to develop a technique capable of more reliably or more stably preventing internal transistors from being turned on simultaneously while synchronous rectification is performed. Further, although a situation associated with synchronous rectification is described, it should be noted that the situation is merely a example for illustration purposes, and the present invention is not limited to a synchronous rectification-type DC/DC converter.

It is an object of the present invention to provide an insulation-type DC/DC converter, an AC/DC converter, a power adapter and an electronic device which are beneficial for enhancing safety of actions of a primary side and a secondary side.

Technical Means for Solving the Problems

The insulation-type DC/DC converter of the present invention is configured to mutually insulate a primary-side circuit disposed on a primary side and a secondary-side circuit disposed on a secondary side of a power transformer, and to perform switch-driving of a switch transistor of a primary-side winding of the power transformer, such that the secondary-side circuit obtains a secondary-side voltage from a primary-side voltage in the primary-side circuit. The insulation-type DC/DC converter includes: a primary-side control portion, disposed on the primary side and performs switch-driving of the switch transistor; a secondary-side control portion, disposed on the secondary-side; and a communication transformer, implementing bi-directional communication between the primary-side control portion and the secondary-side control portion.

Specifically, for example, the insulation-type DC/DC converter may be an insulation synchronous rectification-type DC/DC converter, in which a synchronous rectification transistor is controlled by the secondary-side control portion. The synchronous rectification transistor is disposed on the secondary side so as to implement synchronous rectification. Signals associated with turn-on and turn-off of the switch transistor are transceived between the primary-side control portion and the secondary-side control portion through the communication transformer.

More specifically, for example, in the insulation-type DC/DC converter, the primary-side control portion may also send a predetermined first signal to the secondary-side control portion through the communication transformer when the switch transistor is turned on, and send a predetermined second signal to the secondary-side control portion through the communication transformer when the switch transistor is turned off. The secondary-side control portion controls turn-on and turn-off of the synchronous rectification transistor according to the predetermined first signal and the predetermined second signal received.

At this point, for example, in the insulation-type DC/DC converter, the secondary-side control portion is configured to send a predetermined first response signal to the primary-side control portion through the communication transformer in response to the predetermined first signal received, and to send a predetermined second response signal to the primary-side control portion through the communication transformer in response to the predetermined second signal received. The primary-side control portion may perform, upon not receiving the predetermined first response signal after having sent the predetermined first signal, or upon not receiving the predetermined second response signal after having sent the predetermined second signal, a predetermined communication error process, which includes a process of prohibiting setting the switch transistor to a turned-on state.

Alternatively, for example, in the insulation-type DC/DC converter, the secondary-side control portion may send the predetermined first signal and the predetermined second signal to the primary-side control portion through the communication transformer, wherein the first predetermined signal provides an instruction for turning on the switch transistor and the predetermined second signal provides an instruction for turning off the switch transistor. The primary-side control portion may also turn on the switch transistor in response to the predetermined first signal received, and turn off the switch transistor in response to the predetermined second signal received.

At this point, for example, in the insulation-type DC/DC converter, the primary-side control portion is configured to send the predetermined first response signal to the secondary-side control portion through the communication transformer in response to the predetermined first signal received, and to send the predetermined second response signal to the secondary-side control portion through the communication transformer in response to the predetermined second signal received. The secondary-side control portion may perform, upon not receiving the predetermined first response signal after having sent the predetermined first signal, or upon not receiving the predetermined second response signal after having sent the predetermined second signal, a predetermined communication error process, which includes a process of prohibiting setting the synchronous rectification transistor to a turned-on state.

Further, for example, in the insulation-type DC/DC converter, upon starting to power the primary-side control portion and activation of the primary-side control portion, an initial action is performed regardless of a value of the primary-side voltage, such that switch-driving of the switch transistor is performed. When the secondary-side voltage becomes a predetermined voltage or more and the secondary-side control portion is activated after the initial action is undertaken, predetermined handshake communication is performed between the primary-side control portion and the secondary-side control portion through the communication transformer. A normal action is performed after the handshake communication is correctly completed, and switch-driving of the switch transistor is performed according to the secondary-side voltage.

Further, for example, in the insulation-type DC/DC converter, the primary-side control portion includes a primary-side abnormality detection portion for detecting whether predetermined abnormality exists in the primary-side circuit. If the abnormality is detected in the primary-side circuit, switch-driving of the switch transistor is stopped, and a predetermined primary-side abnormality detection signal is sent to the secondary-side control portion through the communication transformer.

Further, for example, in the insulation-type DC/DC converter, the secondary-side control portion comprises a secondary-side abnormality detection portion for detecting whether predetermined abnormality exists in the secondary-side circuit. If the abnormality is detected in the secondary-side circuit, a predetermined secondary-side abnormality detection signal is sent to the primary-side control portion through the communication transformer, and the primary-side control portion may stop switch-driving of the switch transistor upon receiving the secondary-side abnormality detection signal.

Further, for example, in the insulation-type DC/DC converter, when one control portion of the primary-side control portion and the secondary-side control portion sends a predetermined signal to the other control portion through the communication transformer and the other control portion receives the predetermined signal, the other control portion sends a signal to the one control portion through the communication transformer in response to the predetermined signal received.

An AC/DC converter of the present invention includes: a rectification circuit, performing full-wave rectification on an AC voltage; a smoothing capacitor, smoothing the voltage having undergone full-wave rectification to generate a DC voltage; and the insulation-type DC/DC converter, thereby generating a DC secondary-side voltage from a primary-side voltage of the DC voltage as an output voltage.

A power adapter of the present invention includes: a plug, receiving an AC voltage; the AC/DC converter; and a housing, accommodating the AC/DC converter.

An electronic device of the present invention includes: the AC/DC converter; and a load device, driven by an output voltage of the AC/DC converter.

Effects of the Invention

According to the present invention, an insulation-type DC/DC converter, an AC/DC converter, a power adapter and an electronic device beneficial for enhancing safety of actions of a primary side and a secondary side are provided.

DETAILED DESCRIPTION OF THE EMBODIMENTS

Example of embodiments of the present invention are specifically described with the accompanying drawings below. In the reference drawings, the same symbols and numerals are denoted for the same components, and repeated description of the same components is in principle omitted. Further, in the description, for brevity, numerals or symbols of reference information, signals, physical quantities, elements or components are given in order to omit or abbreviate the names of the reference information, signals, physical quantities, elements or components. For example, a switch transistor (referring to FIG. 1) denoted as "M1" is sometimes expressed as a switch transistor M1 and is sometimes expressed as a transistor M1 for short, both however referring to the same component.

First of all, several terms used in the description of the embodiments are explained below. A so-called "level" refers to a level of potential, and is associated with any signal or voltage, and a high level has a potential higher than that of a low level. For any signal or voltage having a level periodically switching between a low level and a high level, the ratio of a time period in which the level of the signal or voltage is at a high level to a time period of one cycle of the signal or voltage is referred to as a duty cycle.

For any transistor having a structure of a field-effect transistor (FET), a turned-on state thereof refers to a turned-on state between the drain and the source of the transistor; and a so-called turned-off state refers to a non-turned-on state (interrupted state) between the drain and the source of the transistor. The same applies to a transistor that is not an FET. In the description below, a turned-on state or a turned-off state may be expressed as turned on and turned off. For any transistor, switching from a turned-off state to a turned-on state is expressed as turning on, and switching from a turned-on state to a turned-off state is expressed as turning off. Further, for any transistor, a period of a turned-on state of the transistor is sometimes referred to as a turned-on period, and a period of a turned-off state of the transistor is sometimes referred to as a turned-off period.

First Embodiment

Figure 1:
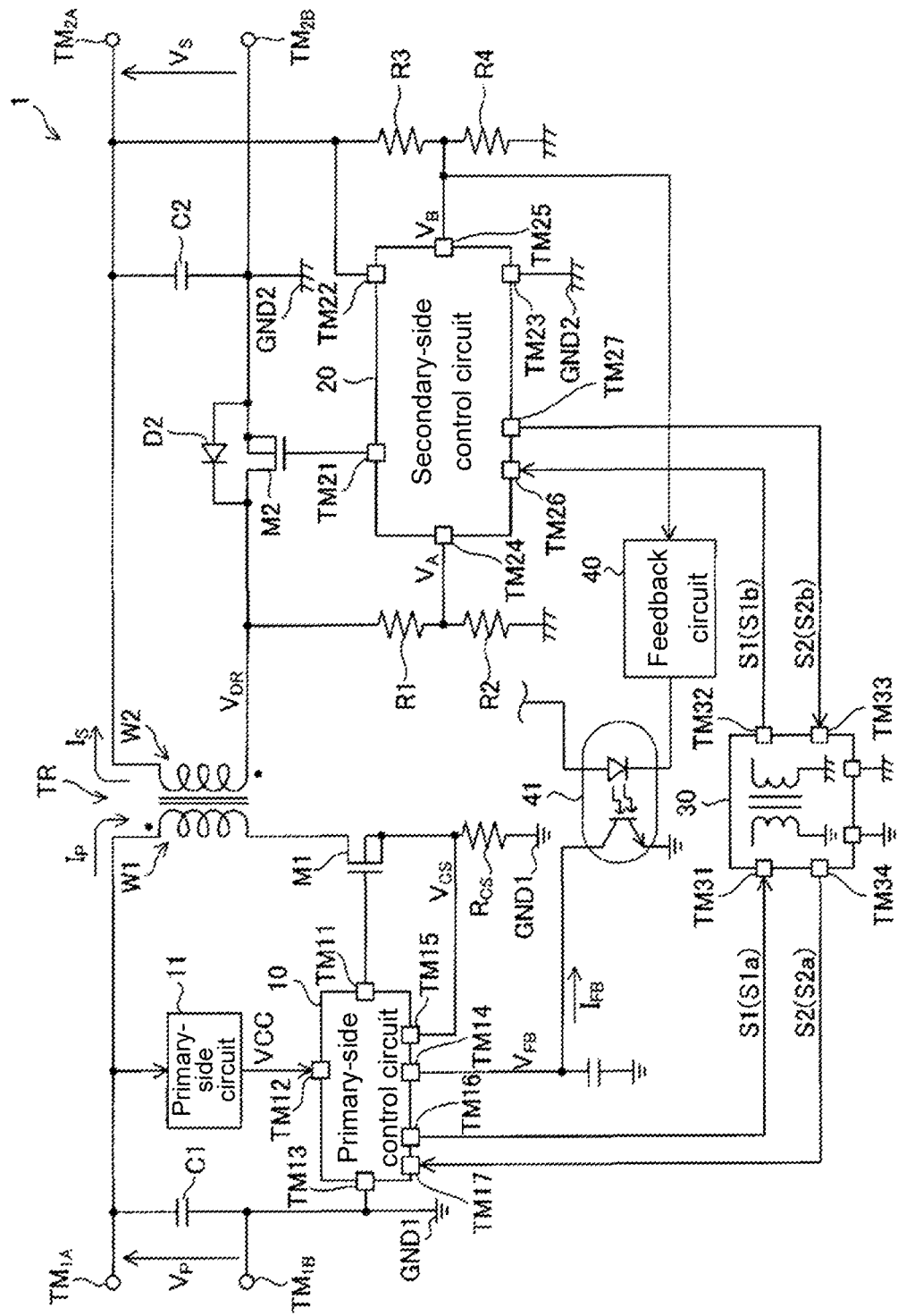
FIG. 1 shows an overall structural diagram of an insulation synchronous rectification-type DC/DC converter according to a first embodiment of the present invention.

The first embodiment of the present invention is described below. FIG. 1 shows an overall structural diagram of an insulation synchronous rectification-type DC/DC converter 1 (to be referred to as the DC/DC converter 1 for short hereafter) according to a first embodiment of the present invention. The DC/DC converter 1 is a flyback DC/DC converter, and generates and stabilizes a DC primary-side voltage $V_P$ into a DC secondary-side voltage $V_S$ of a predetermined target voltage $V_{TG}$.

The DC/DC converter 1 includes a primary-side circuit disposed on the primary side of the DC/DC converter 1 and a secondary-side circuit disposed on the secondary side of the DC/DC converter 1, and the primary-side circuit and the secondary-side circuit are mutually insulated. The ground terminal in the primary-side circuit is referenced as "GND1", and the ground terminal in the secondary-side circuit is referenced as "GND2". The primary-side voltage $V_P$ is a voltage regarding the ground terminal GND1 as a reference, and the primary-side voltage $V_S$ is a voltage regarding the ground terminal GND2 as a reference. In each of the primary-side circuit and the secondary-side circuit, the ground terminal refers to a conductive portion (a predetermined potential point) having a reference potential of 0 V or a reference potential itself. However, because the ground terminal GND1 and the ground terminal GND2 are mutually insulated, they may have potentials different from each other.

Between a pair of input terminals $TM_{1A}$ and $TM_{1B}$ in the DC/DC converter 1, the input terminal $TM_{1B}$ is connected to the ground terminal GND1, and applies the primary-side voltage $V_P$ to the input terminal $TM_{1A}$ by using the potential of the input terminal $TM_{1B}$ as a reference. Between a pair of output terminals $TM_{2A}$ and $TM_{2B}$ in the DC/DC converter 1, the output terminal $TM_{2B}$ is connected to the ground terminal GND2, and applies the secondary-side voltage $V_S$ to the output terminal $TM_{2A}$ by using the potential of the output terminal $TM_{2B}$ as a reference. The DC/DC converter 1 is capable of supplying the secondary-side voltage $V_S$ to any load device (not shown) connected between the output terminals $TM_{2A}$ and $TM_{2B}$.

The DC/DC converter 1 includes a power transformer having a primary-side winding W1 and a secondary-side winding W2, i.e., a transformer TR. In the transformer TR, the primary-side winding W1 and the secondary-side winding W2 are mutually electrically insulated and are magnetically coupled by opposite polarities.

In the DC/DC converter 1, a communication transformer, as a characteristic element, i.e., a pulse transformer portion 30, is provided, and the pulse transformer portion 30 may be used to implement various actions. Elements other than the pulse transformer portion 30 are described below. Further, by using the pulse transformer portion 30, a feedback circuit 40 and an optocoupler 41 may also be omitted. The above case is described in other embodiments below. In principle, the feedback circuit 40 and the optocoupler 41 are provided in the DC/DC converter 1.

In the primary-side circuit of the DC/DC converter 1, apart from the primary-side winding S1, a primary-side control portion 10, a primary-side power circuit 11, a capacitor C1 equivalent to an input capacitor, a switch transistor M1 and a sensing resistor $R_{CS}$ are further provided. The switch transistor M1 is structured as an N-channel metal-oxide-semiconductor field-effect transistor (MOSFET). One end of the primary-side winding W1 is connected to the input terminal $TM_{1A}$ to receive the DC primary-side voltage $V_P$. The other end of the primary-side winding W1 is connected to the drain of the switch transistor M1, and the source of the switch transistor M1 is connected to the ground terminal GND1 through the sensing resistor $R_{CS}$. The capacitor C1 is disposed between the input terminals $TM_{1A}$ and $TM_{1B}$, and the primary-side voltage $V_P$ is applied between two terminals of the capacitor C1. The primary-side power circuit 11 performs DC-DC conversion on the primary-side voltage $V_P$ to generate and provide a power voltage VCC having an expected voltage value to the primary-side control portion 10. The primary-side control portion 10 performs driving based on the power voltage VCC.

The secondary-side circuit of the DC/DC converter 1 further includes, in addition to the secondary-side winding W2, a secondary-side control portion 20, a feedback circuit 40, a synchronous rectification transistor M2, a diode D2, voltage dividing resistors R1 to R4, and a capacitor R2 equivalent to an output capacitor. The synchronous rectification transistor M2 (to be referred to as an SR transistor M2 hereafter) is structured as an N-type MOSFET. The diode D2 is a parasitic diode of the SR transistor M2. Thus, a direction from the source to the drain of the SR transistor M2 is set as a forward direction, and the diode D2 is connected in parallel to the SR transistor M2. The diode D2 may also be a diode separately provided from the parasitic diode.

One end of the secondary-side winding W2 is connected to the output terminal $TM_{2A}$, and thus the secondary-side voltage $V_S$ is applied to one end of the secondary-side winding W2. The other end of the secondary-side winding W2 is connected to the drain of the SR transistor M2. The voltage of the other end of the secondary-side winding W2 (in other words, the drain voltage of the SR transistor M2) is represented by "$V_{DR}$". A connecting node between the other end of the secondary-side winding W2 and the drain of the SR transistor M2 is connected to one terminal of the voltage dividing resistor R1, and the other terminal of the voltage dividing resistor R1 is connected to the ground terminal GND2 through the voltage dividing resistor R2. Thus, a divided voltage of the voltage $V_{DR}$, i.e., the voltage $V_A$, is applied to a connecting node between the voltage dividing resistors R1 and R2. On the other hand, the output terminal $TM_{2A}$ applied with the secondary-side voltage $V_S$ is connected to one terminal of the voltage dividing resistor R3, and the other terminal of the voltage dividing resistor R3 is connected to the ground terminal GND2 through the voltage dividing resistor R4. Thus, the divided voltage of the secondary-side voltage $V_S$ applied to a connecting node between the voltage dividing resistors R3 and R4 is a voltage $V_B$.

The source of the SR transistor M2 is connected to the ground terminal GND2. Further, a capacitor C2 is disposed between the output terminals $TM_{2A}$ and $TM_{2B}$, and thus the secondary-side voltage $V_S$ is applied to two terminals of the capacitor C2. A resistor for detecting any over-current generated may also be disposed between the capacitor C2 and the load device (not shown) of the DC/DC converter 1.

The secondary-side control portion 20 uses the secondary-side voltage $V_S$ as a power voltage to perform driving. The secondary-side control portion 20 controls turn-on and turn-off of the SR transistor M2 by controlling the gate voltage of the SR transistor M2. The secondary-side control portion 20 may also perform the control according to the voltage $V_A$ or according to the voltages $V_A$ and $V_B$, and at this point, the gate voltage of the SR transistor M2 may be controlled while the transistors M1 and M2 are not simultaneously turned on. Means for controlling the SR transistor M2 may include any means of any known method, for example, a means of using a comparator as below may be used. When a turned-off state of the SR transistor M2 is considered as a starting point, in the means of using a comparator, the secondary-side control portion 20 turns on the SR transistor M2 when the voltage $V_A$ received becomes lower than a predetermined negative turn-on determination voltage (e.g., −100 mV), and turns off the SR transistor M2 when the voltage $V_A$ received becomes higher than a predetermined negative turn-off determination voltage (e.g., −10 mV). The potential of the turn-off determination voltage is higher than the potential of the turn-on determination voltage.

In the DC/DC converter 1, the optocoupler 41 is disposed throughout the primary-side circuit and the secondary-side circuit. The optocoupler 41 includes a light emitting element disposed at the secondary-side circuit and a light receiving element disposed at the primary-side circuit. A light emitting element of the optocoupler 41 is biased by the secondary-side voltage $V_S$ or by a divided voltage of the secondary-side voltage $V_S$, and the feedback circuit 40 cooperates with the primary-side control portion 10 to drive the light emitting element of the optocoupler 41 by means of having the secondary-side voltage $V_S$ follow the target voltage $V_{TG}$ (that is, by means of having a difference between the voltages $V_S$ and $V_{TG}$ be zero). For example, the feedback circuit 40, as shown in FIG. 1, is connected to the connecting node between the voltage dividing resistors R3 and R4, and supplies a current corresponding to an error between the secondary-side voltage $V_S$ and the target voltage $V_{TG}$ to the light emitting element of the optocoupler 41 according to the voltage $V_B$ corresponding to the secondary-side voltage $V_S$. The feedback resistor 40 is formed by a shunt regulator or an error amplifier.

The primary-side control portion 10 is connected to the light receiving element of the optocoupler 41, and inputs a feedback signal $V_{FB}$ corresponding to a feedback current $I_{FB}$ flowing in the light receiving element of the optocoupler 41 to the primary-side control portion 10. Further, the primary-side control portion 10 inputs a current detection signal $V_{CS}$ equivalent to a voltage drop in the sensing resistor $R_{CS}$ to the primary-side control portion 10.

The primary-side control portion 10 is connected to the gate of the switch transistor M1, and performs switch-driving of the switch transistor M1 by supplying a pulse signal to the gate of the switch transistor M1. The pulse signal is a signal of a rectangular waveform having a signal level switching between a low level and a high level. When signals respectively having a low level and a high level are supplied to the gate of the transistor M1, the transistor M1 becomes a turned-off state and a turned-on state, respectively. The structure and control means of the primary-side control portion 10 are not specifically limited. For example, the primary-side control portion 10 may also employ pulse width modulation (PWM) to supply a pulse signal having a duty cycle corresponding to the feedback signal $V_{FB}$ to the gate of the switch transistor M1, or may employ pulse frequency modulation (PFM) to supply a pulse signal having a frequency corresponding to the feedback signal $V_{FB}$ to the gate of the switch transistor M1. Further, for example, the primary-side control portion 10 may also adjust the duty cycle of the pulse signal according to the current detection signal $V_{CS}$ (that is, according to the current flowing in the switch transistor M1).

A plurality of terminals are provided at the primary-side control portion 10. The plurality of terminals provided at the primary-side control portion 10 include a terminal TM11 connected to the gate of the switch transistor M1, a terminal TM12 for receiving the power voltage VCC, a terminal TM13 connected to the ground terminal GND1, a terminal TM14 for receiving the feedback signal $V_{FB}$, a terminal TM15 for receiving the current detection signal $V_{CS}$, and terminals TM16 and TM17 connected to the pulse transformer portion 30. The terminal TM16 is an output terminal for sending a signal S1 mentioned below, and the terminal TM17 is an input terminal for receiving a signal S2 mentioned below.

A plurality of terminals are provided at the secondary-side control portion 20. The plurality of terminals provided at the secondary-side control portion 20 include a terminal TM21 connected to the gate of the SR transistor M2, a terminal TM22 for receiving the secondary-side voltage $V_S$, a terminal TM23 connected to the ground terminal GND2, a terminal TM24 for receiving the voltage $V_A$, a terminal TM25 for receiving the voltage $V_B$, and terminals TM26 and TM27 connected to the pulse transformer portion 30. The terminal TM26 is an input terminal for receiving the signal S1 mentioned below, and the terminal TM27 is an output terminal for sending the signal S2 mentioned below.

In the DC/DC converter 1 of the above structure, the secondary-side voltage $V_S$ may be obtained from the primary-side voltage $V_P$ by performing switch-driving of the switch transistor M1. That is to say, energy is accumulated in the primary-side winding W1 during a turned-on period of the switch transistor M1, and the energy accumulated is released from the secondary-side winding W2 during a turned-off period of the switch transistor M1, thereby charging the capacitor C2 to obtain the secondary-side voltage $V_S$. The SR transistor M2 is turned on while the energy is released from the secondary-side winding W2 in order to reduce loss.

In addition, an auxiliary winding may also be disposed at the transformer TR as a substitution for the primary-side power circuit 11, and an innate power circuit is thus formed by the auxiliary circuit included to generate the power voltage VCC of the primary-side control portion 10. Moreover, in the primary-side circuit, the current flowing from the input terminal $TM_{1A}$ through the primary-side winding W1 to the ground terminal GND1 is referred to as a primary-side current, and is denoted as "$I_P$". In the secondary-side circuit, the current flowing from ground terminal GND2 through the secondary-side winding W2 to the output terminal $TM_{2A}$ is referred to as a secondary-side current, and is denoted as "$I_S$".

The pulse transformer portion 30 is described below. The pulse transformer portion 30 is a communication transformer for implementing bi-directional communication between the primary-side control portion 10 and the secondary-side control portion 20, and is formed by more than one pulse transformer. In the description below, the so-called bi-directional communication, unless otherwise specified, refers to bi-directional communication between the primary-side control portion 10 and the secondary-side control portion 20.

The signal sent by the primary-side control portion 10 to the secondary-side control portion 20 through the pulse transformer portion 30 is referenced by the denotation "S1". With regard to the signal S1, the signal transmitted in the primary-side circuit is referenced by the denotation "S1a", and the signal transmitted in the secondary-side circuit is referenced by the denotation "S1b". The signals S1a and S1b may be in any forms, and may also be digital signals such as pulse signals.

The signal sent by the secondary-control portion 20 to the primary-side control portion 10 through the pulse transformer portion 30 is referenced by the denotation "S2". With regard to the signal S2, the signal transmitted in the primary-side circuit is referenced by the denotation "S2a", and the signal transmitted in the secondary-side circuit is referenced by the denotation "S2b". The signals S2a and S2b may be in any forms, and may also be digital signals such as pulse signals.

A plurality of terminals are provided at the pulse transformer portion 30. The plurality of terminals provided at the pulse transformer portion 30 include a terminal TM31 for receiving the signal S1a from the primary-side control portion 10, a terminal TM32 for sending the signal S1b to the secondary-side control portion 20, a terminal TM33 for receiving the signal S2b from the secondary-side control portion 20, and a terminal TM34 for sending the signal S2a to the primary-side control portion 10.

Figure 2:
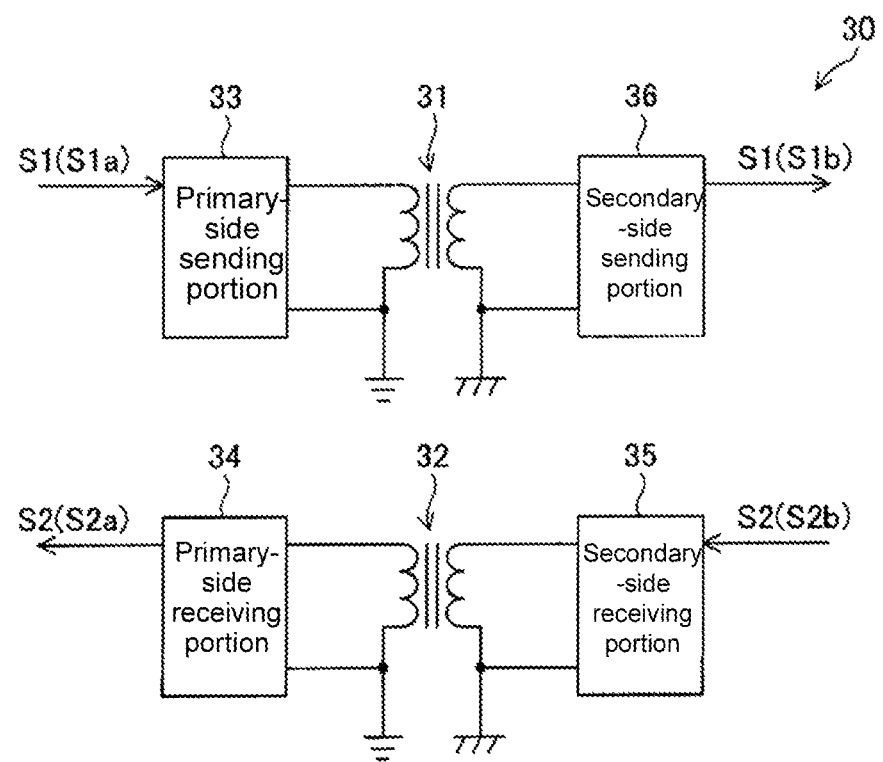
FIG. 2 is a structural diagram of a pulse transformer portion in FIG. 1.

FIG. 2 shows a diagram of an exemplary structure of the pulse transformer portion 30. In the exemplary structure in FIG. 2, the pulse transformer portion 30 includes pulse transformers 31 and 32, a primary-side sending portion 33, a primary-side receiving portion 34, a secondary-side sending portion 35 and a secondary-side receiving portion 36. Each of the pulse transformers 31 and 32 includes a primary-side winding disposed in the primary-side circuit and a secondary-side winding disposed in the secondary-side circuit.

In the primary-side control portion 10 and the secondary-side control portion 20, an embodiment in which the primary-side control portion 10 sends the signal (S1) is referred to as a primary-side sending embodiment. In the primary-side sending embodiment, the primary-side sending portion 33 generates a pulse signal based on the signal S1a from the primary-side control portion 10, and applies the pulse signal generated to the primary-side winding of the pulse transformer 31. The secondary-side receiving portion 36 generates the signal S1b based on the voltage of the secondary-side winding of the pulse transformer 31 generated based on the pulse signal applied above. It may be regarded that information included in the signal S1a is also included in the signal S1b, and the signal S1a and the signal S1b are mutually equivalent. The sending of the signal S1 strictly speaking refers to sending of the signal S1a, and the receiving of the signal S1 strictly speaking refers to receiving of the signal S1b. Unless otherwise required below, the signals S1a and S1b are collectively referred to as the signal S1.

In the primary-side control portion 10 and the secondary-side control portion 20, first of all, an embodiment in which the secondary-side control portion 20 sends the signal (S2) is referred to as a secondary-side sending embodiment. In the secondary-side sending embodiment, the secondary-side sending portion 35 generates a pulse signal based on the signal S2b from the secondary-side control portion 20, and the pulse signal generated is applied to the secondary-side winding of the pulse transformer 32. The primary-side receiving portion 34 generates the signal S2a based on the voltage of the primary-side winding of the pulse transformer 32 generated based on the pulse signal applied above. It may be regarded that information included in the signal S2b is also included in the signal S2a, and the signal S2a and the signal S2b are mutually equivalent. The sending of the signal S2 strictly speaking refers to sending of the signal S2b, and the receiving of the signal S2 strictly speaking refers to receiving of the signal S2a. Unless otherwise required below, the signals S2a and S2b are collectively referred to as the signal S2.

Further, the primary-side sending portion 33, the primary-side receiving portion 34, the secondary-side sending portion 35 and the secondary-side receiving portion 36 may be provided in the pulse transformer portion 30; alternatively, at least one of the primary-side sending portion 33 and the primary-side receiving portion 34 may be provided in the primary-side control portion 10, or at least one of the secondary-side sending portion 35 and the secondary-side receiving portion 36 may be provided in the secondary-side control portion 20.

The pulse transformer portion 30 configured as above enables information of the primary side and information of the secondary side to be shared between the primary-side control portion 10 and the secondary-side control portion 20. Thus, for example, when abnormality occurs in any one between the control portions 10 and 20, actions of the primary-side circuit and the secondary-side circuit may be immediately stopped to ensure safety. Further, various other advantages may be achieved, such as appropriately controlling time points for turning on/off the transistors M1 and M2 by using the bi-directional communication of the pulse transformer portion 30.

Figure 3:
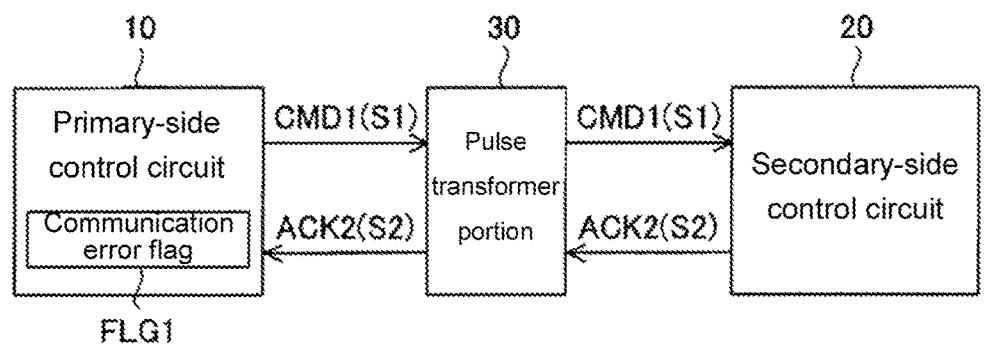
FIGS. 3(a) and (b) are diagrams illustrating bi-directional communication signals between a primary-side control portion and a secondary-side control portion.
Figure 3:
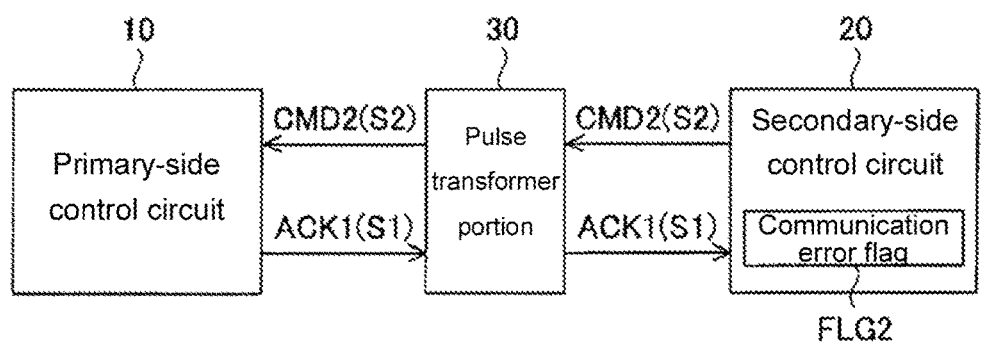

As shown in FIG. 3(a), in the primary-side sending embodiment, the predetermined signal S1 sent from the primary-side control portion 10 may be specifically referred to as a reference signal CMD1 (or the reference signal may be referred to as an instruction signal). In the primary-side sending embodiment, the secondary-side control portion 20 may send the predetermined signal S2 without any delay upon receiving the reference signal CMD1, wherein the predetermined signal S2 is for responding to the reference signal CMD1 received. The signal S2 in response to the reference signal CMD1 received is specifically referred to as a response signal ACK2. Sending the response signal ACK2 is equivalent to responding to the reference signal CMD1. The primary-side control portion 10 may determine, by receiving the response signal ACK2, that the secondary-side control portion 20 correctly receives the reference signal CMD1.

In the primary-side sending embodiment, if the primary-side control portion 10 does not receive the response signal ACK2 (S2) after a predetermined time period subsequent having sent the reference signal CMD1 (S1), the primary-side control portion 10 may perform a predetermined communication error process. The communication error process performed by the primary-side control portion 10 includes a process of setting a communication flag FLG1 to "1", and may further include a communication error report process.

The communication error flag FLG1 is stored by the primary-side control portion 10, and has a value of "0" or "1". The initial value of the communication error flag FLG1 is "1", and the communication error flag FLG1 is set to "0" upon correctly completing handshake communication. In the primary-side control portion 10, when the flag FLG1 is set to "1", the switch transistor M1 is prohibited from being set to a turned-on state (thus, the transistor M1 is kept in a turned-off state), and the switch transistor M1 is set to a turned-on state only when the flag FLG1 is set to "0" (except for when a burst charge action below is performed). Thus, it may be said that the error communication error process of the primary-side control portion 10 includes a process of prohibiting setting the switch transistor M to a turned-on state (in other words, a process of turning off the switch transistor M1 or keeping the switch transistor M1 in a turned-off state), and the transistor M1 is immediately turned off if the communication error process is performed while the transistor M1 is turned on.

As shown in FIG. 3(b), in the secondary-side sending embodiment, sometimes the predetermined signal S2 sent from the secondary-side control portion 20 is specifically referred to as a reference signal CMD2 (or the reference signal is referred to as an instruction signal). In the secondary-side sending embodiment, the primary-side control portion 10 may send the predetermined signal S1 without any delay upon receiving the reference signal CMD2, wherein the predetermined signal St is for responding to the reference signal CMD2 received. The signal S1 in response to the reference signal CMD2 received is specifically referred to as a response signal ACK1. Sending the response signal ACK1 is equivalent to responding to the reference signal CMD2. The secondary-side control portion 20 may determine, by receiving the response signal ACK1, that the primary-side control portion 10 correctly receives the reference signal CMD2.

In the secondary-side sending embodiment, if the secondary-side control portion 20 does not receive the response signal ACK1 (S1) after a predetermined time period subsequent to having sent the reference signal CMD2 (S2), the secondary-side control portion 20 may perform a predetermined communication error process. The communication error process performed by the secondary-side control portion 20 includes a process of setting a communication error flag FLG2 to "1", and may further include a communication error report process.

The communication error flag FLG2 is stored by the secondary-side control portion 20, and has a value of "0" or "1". The initial value of the communication error flag FLG2 is "1", and the communication error flag FLG2 is set to "O" upon correctly completing handshake communication. In the secondary-side control portion 20, when the flag FLG2 is set to "1", the SR transistor M2 is prohibited from being set to a turned-on state (thus, the transistor M2 is kept in a turned-off state), and the secondary-side control portion 20 only allows the SR transistor M2 to be set to a turned-on state when the flag FLG2 is set to "0". Thus, it can be said that the error communication error process of the secondary-side control portion 20 includes a process of prohibiting setting the SR transistor M2 to a turned-on state (in other words, a process of turning off the SR transistor M2 or keeping the SR transistor M2 in a turned-off state), and the transistor M2 is immediately turned off if the communication error process is performed while the transistor M2 is turned on.

The communication error report process may be a process such as below: using a predetermined report portion (e.g., a light emitting element, an image display portion or a speaker) to report a predetermined communication error to an external terminal of the DC/DC converter 1, wherein the predetermined report portion is built-in the DC/DC converter 1 or is connected to the DC/DC converter 1. The communication error report may also be a visual or audio report for indicating that abnormality has occurred in the bi-directional communication.

Specific actions and control methods of using the pulse transformer portion 30 are described in the embodiments below. Further, when the primary-side control portion 10 and the secondary-side control portion 20 cooperate through bi-directional communication, a so-called master/slave method may be used, wherein any one of the primary-side control portion 10 and the secondary-side control portion 20 is the master and the other is the slave.

Second Embodiment

The second embodiment of the present invention is described below. The second embodiment as well as third to seventh embodiments below are embodiments based on the first embodiment. Regarding items that are not specified in the second to seventh embodiments, the details of the description associated with the first embodiment are also applicable to the second to seventh embodiments, given that there is no contradiction. In the description explaining the second embodiment, the items that are contradictory, if any, between the first and second embodiments, the description of the second embodiment prevails (the same applies to the third to seventh embodiments below). Given that there is no contradiction, any multiple embodiments among the first to seventh embodiments may be combined.

The second embodiment includes embodiments EX2_1 to EX2_3 below. For signals that may be transceived by the pulse transformer portion 30 and associated with turn-on and turn-off control of the transistors M1 and M2, an example of such transceiving is described in the embodiments EX2_1 to EX2_3 below. Further, the actions illustrated in the second embodiment are actions after a handshake action is correctly completed, and are actions in a situation where the communication error flags FLG1 and FLG2 are set to "0", unless otherwise specified.

Embodiment EX2_1

The embodiment EX2_1 is described below. In the embodiment EX2_1, the primary-side control portion 10 is the master, and the secondary-side control portion 20 is the slave. The primary-side control portion 10 of the embodiment EX2_1 may control turn-on and turn-off of the switch transistor M1 according to the method of using the feedback signal $F_{VB}$ or the current detection signal $V_{CS}$ as described in the first embodiment. Further, in the embodiment EX2_1, it is assumed that the secondary-side control portion 20 uses the means of a comparator. The means of a comparator determines a method for time points of turn-on and turn-off of the SR transistor M2 according to the voltage $V_{DR}$ (more specifically, according to a comparison result between the voltage $V_A$ corresponding to the voltage $V_{DR}$ and the turn-on determination voltage and the turn-off determination voltage).

Figure 4:
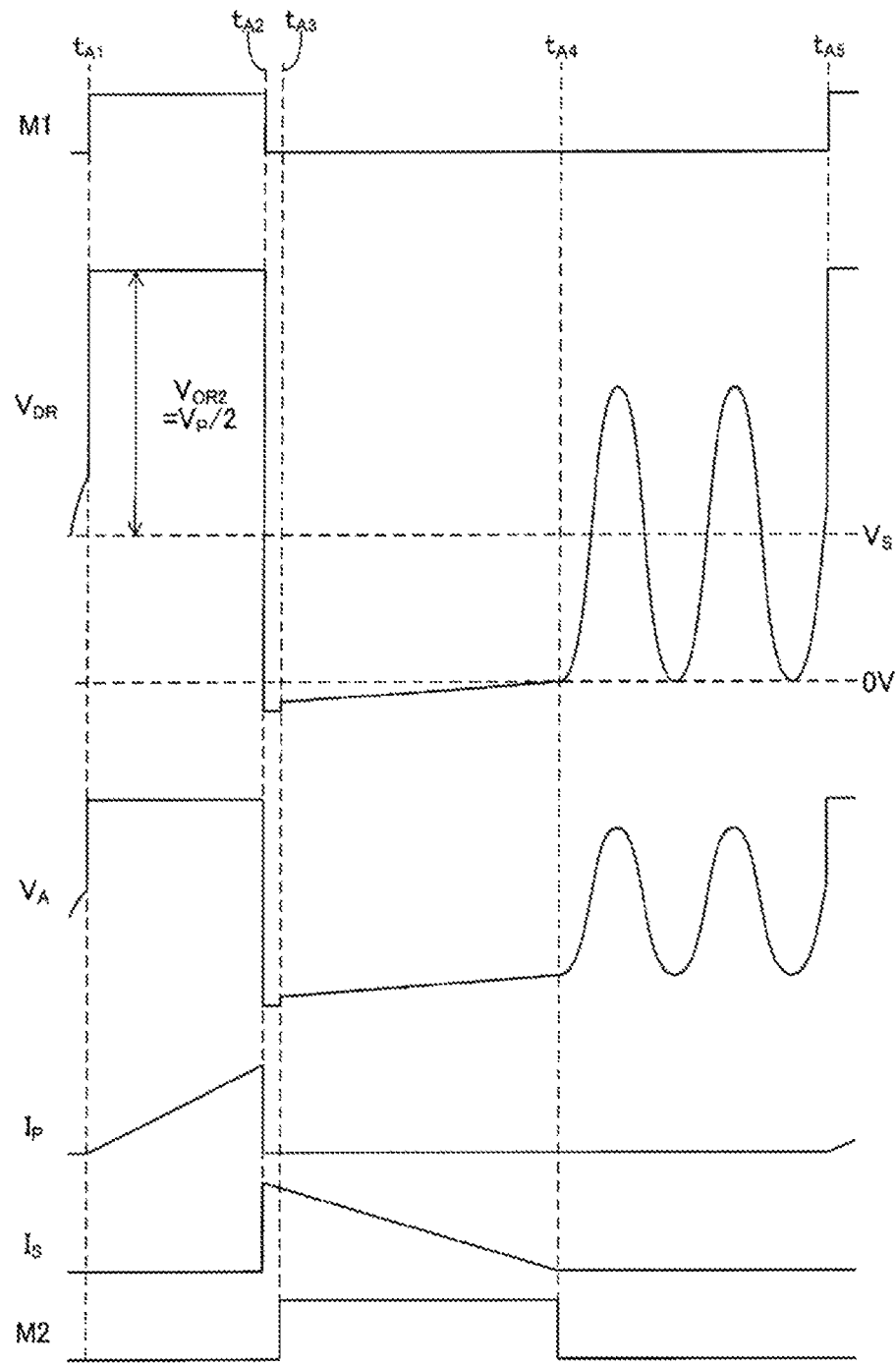
FIG. 4 is a diagram of waveforms of components in a DC/DC converter according to a second embodiment of the present invention.

Refer to FIG. 4 for specific description of the means of a comparator. FIG. 4 shows a timing diagram of assuming that the DC/DC converter 1 is in a discontinuous mode according to the embodiment EX2_1. The switch transistor M1 is in a turned-on state in a period between time points $t_{41}$ and $t_{42}$ under the control of the primary-side control portion 10, and then the switch transistor M1 is in a turned-off state in a period up to a time point $t_{45}$. The transistors M1 and M2 are controlled by means of having the SR transistor M2 be in a turned-off state during a turned-on period of the switch transistor M1, and having the switch transistor M1 be in a turned-off state during a turned-on period of the SR transistor M2.

In the turn-on period of the switch transistor M1, the current $I_P$ flows in the primary-side winding W2, and the voltage $V_{DR}$ is higher than the secondary-side voltage $V_S$ by only a voltage $V_{OR2}$. The voltage $V_{OR2}$ is a sensing voltage generated at the secondary-side winding W2 during the turn-on period of the switch transistor M1. The sensing voltage $V_{OR2}$ uses a turn ratio n of the primary-side voltage $V_P$ to the transformer TR, and is represented as "$V_{OR2}=V_P/n$". Further, the turn ratio n is represented as "$n=N_P/N_S$", wherein $N_P$ is the number of turns of the primary-side winding W1 and $N_S$ is the number of turns of the secondary-side winding W2.

When the switch transistor M1 is turned off at the time point $t_{42}$, the voltages $V_{DR}$ and $V_A$ continue to drop, and the secondary-side current $I_S$ flows through the diode D2. As a result, when the secondary-side control portion 20 detects that the voltage $V_A$ is lower than the predetermined negative turn-on determination voltage (e.g., –100 mA), the secondary-side control portion 20 turns on the SR transistor M2. The time point $t_{43}$ represents a turn-on time point of the SR transistor M2.

After the SR transistor M2 is turned on, the secondary-side current is flows through the channel of the SR transistor M2, and the size of the secondary-side current $I_S$ and the energy stored in the transformer TR are together reduced. At the time point $t_{44}$ subsequent to the time point $t_{43}$, the secondary-side control portion 20 turns off the SR transistor M2. For example, the secondary-side control portion 20 turns off the SR transistor M2 when the voltage $V_A$ received becomes higher than a predetermined negative turn-off determination voltage (e.g., –10 mA). The potential of the turn-off determination voltage is higher than the potential of the turn-on determination voltage. The turn-off time point $t_{44}$ of the SR transistor M2 may also be a time point determined with reference to the voltage $V_B$. Next, under the control of the primary-side control portion 10, the switch transistor M1 is turned on at the time point $t_{45}$. Then, the same actions are repeated.

By using the means of a comparator for controlling the SR transistor M2 as a premise, bi-directional communication of using the pulse transformer portion 30 is performed as below.

Figure 5:
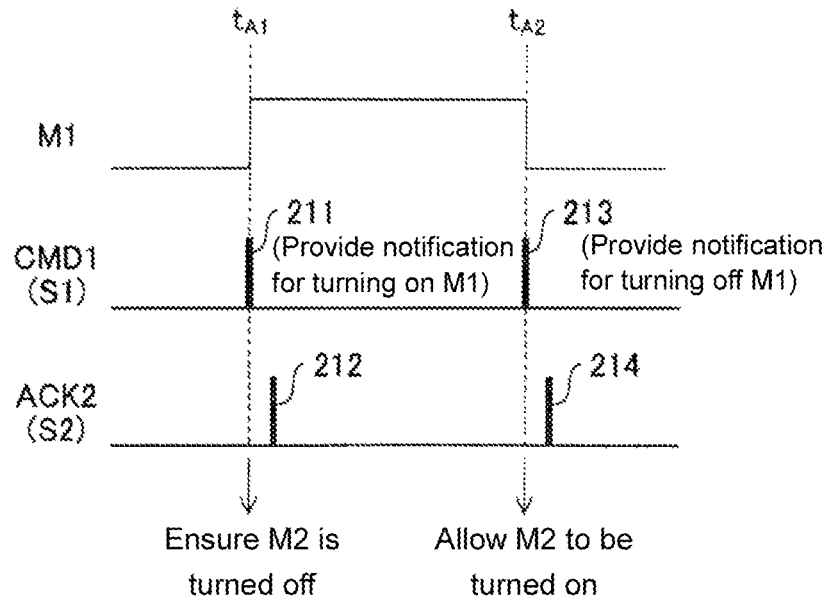
FIG. 5 is a diagram of an exemplary relationship (embodiment EX2_1) between the state of a switch transistor and bi-directional communication signals according to the second embodiment of the present invention.

FIG. 5 shows a timing diagram near the time points $t_{41}$ and $t_{42}$. When the primary-side control portion 10 turns on the switch transistor M1 at the time point $t_{41}$, it synchronously sends the reference signal CMD1 serving as the signal S1 (the reference signal CMD1 is referred to as a reference signal 211). The reference signal 211 is for providing an instruction for turning on the transistor M1. The secondary-side control portion 20 receiving the reference signal 211 (CMD1) sends the response signal ACK2 serving as the signal S2 without any delay (the response signal ACK2 is referred to as a response signal 212). The time point for sending the reference signal 211 may coincide with the time point $t_{41}$, or may be slightly shifted from the time point $t_{42}$. The secondary-side control portion 20 in principle may use the means of a comparator to determine turn-on and turn-off time points of the SR transistor M2. However, when the reference signal 211 is received while the SR transistor M2 is in a turned-on state, the SR transistor M2 is immediately turned off without relying on the voltage $V_A$. That is to say, the secondary-side control portion 20 receiving the reference signal 211 (CMD1) ensures a turned-off state of the SR transistor M2. The so-called ensuring of turn-off state of the SR transistor M2 refers to turning off the SR transistor M2 if the SR transistor M2 is in a turned-on state, and keeping the SR transistor M2 in a turned-off state if the SR transistor M2 is already in a turned-off state. According to conditions, the switch transistor M1 may also be turned on before the detection voltage $V_A$ becomes higher than the turn-off determination voltage; however, an undesirable situation caused by simultaneously turned on transistors M1 and M2 may be suppressed according to the method above.

Further, when the primary-side control portion 10 turns off the switch transistor M1 at the time point $t_{42}$, it synchronously sends the reference signal CMD1 serving as the signal S1 (the reference signal CMD1 is referred to as a reference signal 213). The reference signal 213 is for providing an instruction for turning off the transistor M1. The secondary-side control portion 20 receiving the reference signal 213 (CMD1) sends the response signal ACK2 serving as the signal S2 without any delay (the response signal ACK2 is referred to as a response signal 214). The time point for sending the reference signal 213 may coincide with the time point $t_{42}$, or may be slightly shifted from the timing point $t_{42}$. The secondary-side control portion 20 in principle may use the means of a comparator to determine turn-on and turn-off time points of the SR transistor M2. However, when the reference signal 213 is received while the SR transistor M2 is in a turned-off state, the SR transistor M2 is immediately turned on without relying on the voltage $V_A$. Thus, loss in the secondary-side circuit may be further reduced.

Further, as described in the first embodiment, if the response signal ACK2 (212 and 214 in FIG. 5) is not received after having sent the reference signal CMD1 (211 and 213 in FIG. 5), the primary-side control portion 10 may perform a communication error process.

However, in the method in FIG. 5, a situation where the transistors M1 and M2 are simultaneously turned on may exist even within a short time. If the length of a period in which the transistors M1 and M2 are simultaneously turned on is short enough, no substantial problem would be incurred. However, in order to reliably prevent the transistors M1 and M2 from being turned on simultaneously, an improving method as shown in FIG. 6 may be used.

Figure 6:
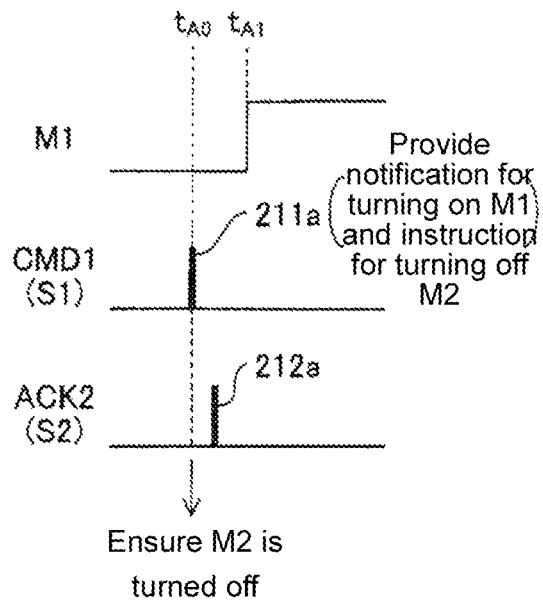
FIG. 6 is a diagram of an exemplary relationship (embodiment EX2_1) between the state of a switch transistor and bi-directional communication signals according to the second embodiment of the present invention.

FIG. 6 is a timing diagram near the time point $t_{A1}$ of the improving method. In the improving method, before the primary-side control portion 10 turns on the switch transistor M1, it sends the reference signal CMD1 serving as the signal S1 at the time point $t_{A0}$ (the reference signal CMD1 is referred to as a reference signal 211a). The reference signal 211a is for providing a notification for turning on the switch transistor M1, and is for providing an instruction for ensuring a turn-off state of the SR transistor M2. The secondary-side control portion 20 receiving the reference signal 211a (CMD1) ensures a turned-off state of the SR transistor M2, and sends a response signal ACK2 serving as the signal S2 (the response signal ACK2 is referred to as a response signal 212a). The primary-side control portion 10 turns on the switch transistor M1 at the time point $t_{A1}$ upon receiving the response signal 212a. The primary-side control portion 10 does not turn on the switch transistor M1 but keeps it in a turned-off state, given that the response signal 212a is not received. Thus, the transistors M1 and M2 are prevented from being turned on simultaneously, thereby enhancing the safety of the DC/DC converter 1.

According to the method of the embodiment EX2_1 based on the means of a comparator, loss may be reduced or safety may be enhanced similarly by using bi-directional communication. In the means of a comparator, in most cases, the responding ability of a circuit for determining turn-on and turn off time points of the SR transistor M2 becomes critical, and according to the method of the embodiment EX2_1, turn-on and turn-off time points of the SR transistor M2 may also be determined by using the signal S1 (CMD1) from the primary-side control portion 10. Therefore, the requirements on the responding ability of the circuit may be alleviated, and power consumption associated with the means of a comparator may also be reduced.

Embodiment EX2_2

The embodiment EX2_2 is described below. In the embodiment EX2_2, similar to the embodiment EX2_1, the primary-side control portion 10 is the master, and the secondary-side control portion 20 is the slave. The primary-side control portion 10 of the embodiment EX2_2 may control turn-on and turn-off of the switch transistor M1 by using the method based on the feedback signal $V_{FB}$ or the current detection signal $V_{CS}$ as described in the first embodiment. In the embodiment EX2_2, the means of a comparator is not used in the secondary-side control portion 20, but the SR transistor M2 is controlled under an instruction from the primary-side control portion 10. The above is specifically described below with reference to FIG. 7.

Figure 7:
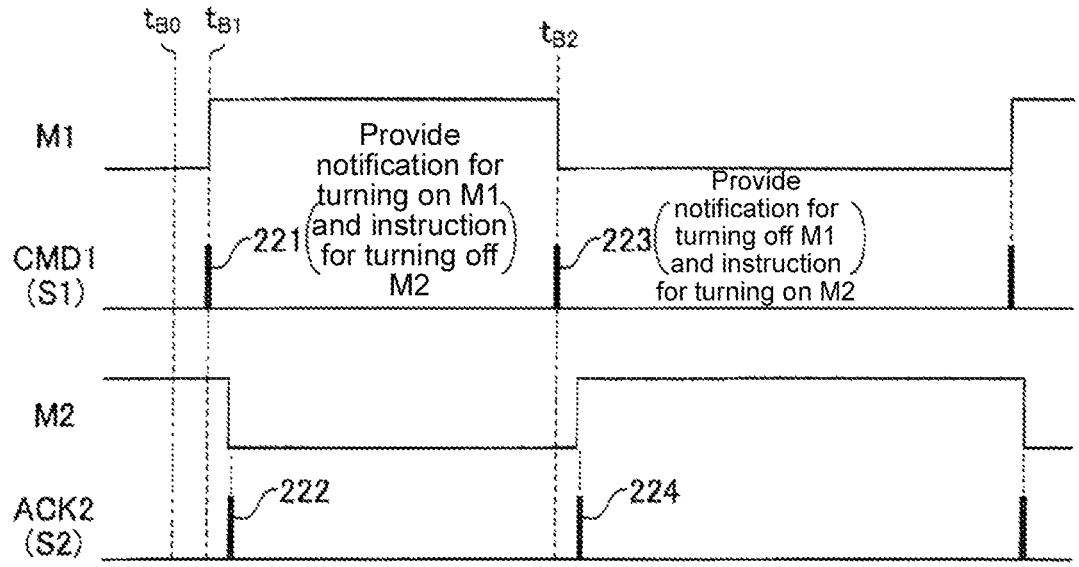
FIG. 7 is a diagram of an exemplary relationship (embodiment EX2_2) between the states of a switch transistor and a synchronous rectification transistor and bi-directional communication signals according to the second embodiment of the present invention.

FIG. 7 shows a timing diagram of a DC/DC converter 1 according to the embodiment EX2_2. In the example in FIG. 7, the transistors M1 and M2 are respectively in a turned-off state and a turned-on state at a time point $t_{B0}$, and the primary-side control portion 10 turns on the switch transistor M1 at the subsequent time point $t_{B1}$.

When the primary-side control portion 10 turns on the switch transistor M1 at the time point $t_{B1}$, it synchronously sends the reference signal CMD1 serving as the signal S1 (the reference signal CMD1 is referred to as a reference signal 221). The reference signal 211 is for providing a notification for turning on the transistor M1, and is for providing an instruction for turning off the SR transistor M2. The secondary-side control portion 20 receiving the reference signal 221 (CMD1) turns off the SR transistor M2 without any delay, and sends a response signal ACK2 serving as the signal S2 (the response signal ACK2 is referred to as a response signal 222). Further, in the example in FIG. 7, the SR transistor M2 is turned off in response to the reference signal 221 received; however, under the control of the secondary-side control portion 20, the SR transistor M2 may also be turned off according to the voltage $V_A$ before the time point $t_{B1}$.

When the primary-side control portion 10 turns off the switch transistor M1 at a time point $t_{B2}$ subsequent to the time point $t_{B1}$, it synchronously sends the reference signal CMD1 serving as the signal S1 (the reference signal CMD1 is referred to as a reference signal 223). The reference signal 223 is for providing a notification for turning off the transistor M1, and is for providing an instruction for turning on the SR transistor M2. The secondary-side control portion 20 receiving the reference signal 223 (CMD1) turns on the SR transistor M2 without any delay, and sends a response signal ACK2 serving as the signal S2 (the response signal ACK2 is referred to as a response signal 224).

Later, upon arriving at a time point for turning on and a time point for turning off the switch transistor M1, the same actions are repeated. Further, as described in the first embodiment, if the response signal ACK2 (222 and 224 in FIG. 7) is not received after having sent the reference signal CMD1 (221 and 223 in FIG. 7), the primary-side control portion 10 may perform a communication error process.

According to the method of the embodiment EX2_2, similar to the embodiment EX2_1, appropriate synchronous rectification that ensures safety may be performed, such that circuit needed for implementing the means of a comparator may be omitted, thereby decreasing the scale of circuits in the secondary-side circuit and reducing power consumption associated with the means of a comparator.

However, in the method in FIG. 7, a situation where the transistors M1 and M2 are simultaneously turned on may exist even within a short time. If the length of a period in which the transistors M1 and M2 are simultaneously turned on is short enough, no substantial problem would be incurred. However, in order to reliably prevent the transistors M1 and M2 from being turned on simultaneously, an improving method as shown in FIG. 8 may be used.

Figure 8:
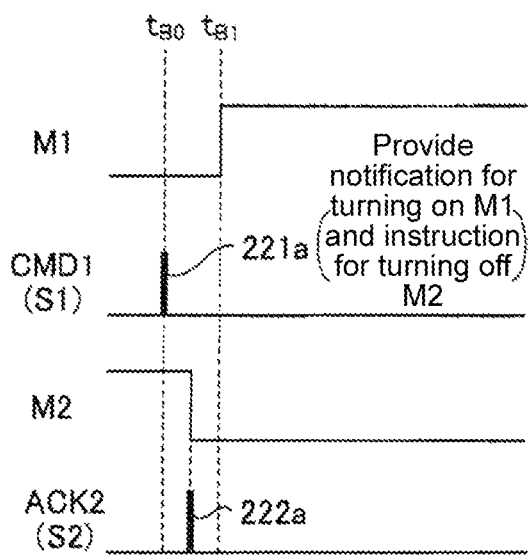
FIG. 8 is a diagram of an exemplary relationship (embodiment EX2_2) between the states of a switch transistor and a synchronous rectification transistor and bi-directional communication signals according to the second embodiment of the present invention.

FIG. 8 is a timing diagram near the time point $t_{B1}$ of the improving method. In the improving method, before the primary-side control portion 10 turns on the switch transistor M1, it sends the reference signal CMD1 serving as the signal S1 at the time point $t_{B0}$ (the reference signal CMD1 is referred to as a reference signal 221a). The reference signal 221a is for providing a notification for turning on the switch transistor M1, and is for providing an instruction for turning off the SR transistor M2 (or for providing an instruction for ensuring a turned-off state of the SR transistor M2). In the example in FIG. 8, at the time point $t_{B0}$, the transistors M1 and M2 are respectively in a turned-off state and a turned-on state; however, under the control of the secondary-side control portion 20, the SR transistor M2 may also be turned off according to the voltage $V_A$ before the time point $t_{B0}$. The secondary-side control portion 20 receiving the reference signal 221a (CMD1) ensures a turned-off state of the SR transistor M2, and sends a response signal ACK2 serving as the signal S2 (the response signal ACK2 is referred to as a response signal 222a). The primary-side control portion 10 turns on the switch transistor M1 at the time point $t_{B1}$ in response to the response signal 222a received. The primary-side control portion 10 does not turn on the switch transistor M1 but keeps it in a turned-off state, given that the response signal 222a is not received. Thus, the transistors M1 and M2 are prevented from being turned on simultaneously, thereby enhancing the safety of the DC/DC converter 1.

Embodiment EX2_3

The embodiment EX2_3 is described below. In the embodiment EX2_3, it is assumed that the secondary-side control portion 20 is the master, and the primary-side control portion 10 is the slave. Further, the secondary-side control portion 20 of the embodiment EX2_3 instructs, according to the secondary-side voltage $V_S$ (according to the voltage $V_B$ in the structure in FIG. 1) the primary-side control portion 10 by sending a reference signal CMD2, to turn on and turn off the switch transistor M1, hence controlling turn-on and turn-off of the switch transistor M1. For example, the secondary-side control portion 20 may use PWM (pulse width modulation) to send the reference signal CMD2 so as to supply a pulse signal having a duty cycle corresponding to the secondary-side voltage $V_S$ to the gate of the switch transistor M1, or may use PFM (pulse frequency modulation) to send the reference signal CMD2 so as to supply a pulse signal having a frequency corresponding to the secondary-side voltage $V_S$ to the gate of the switch transistor M1. At this point, the secondary-side control portion 20 may control turn-on and turn-off of the switch transistor M1 by sending the reference signal CMD2 and by means of having the secondary-side voltage $V_S$ follow the target voltage $V_{TG}$ (that is, by means of having a difference between the voltages $V_S$ and $V_{TG}$ be zero) according to the voltage Vu corresponding to the secondary-side voltage $V_S$.

In the embodiment EX2_3, without sending the feedback signal $V_{FB}$ to the primary-side control portion 10, the secondary-side control portion 20 is used as the master to control the switch transistor M1 corresponding to the secondary-side voltage $V_S$, and thus the feedback circuit 40 and the optocoupler 41 may be omitted from the DC/DC converter 1.

Figure 9:
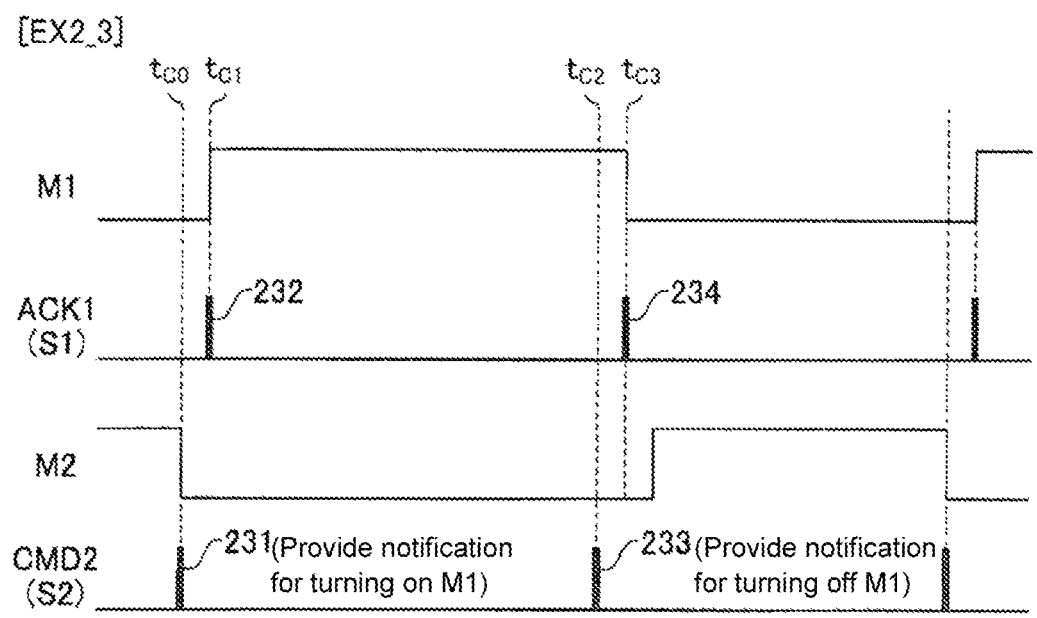
FIG. 9 is a diagram of an exemplary relationship (embodiment EX2_3) between the states of a switch transistor and a synchronous rectification transistor and bi-directional communication signals according to the second embodiment of the present invention.

FIG. 9 shows a timing diagram of the DC/DC converter 1 according to the embodiment EX2_3. In the example in FIG. 9, before arriving at a time point $t_{C0}$, the transistors M1 and M2 are respectively in a turned-off state and a turned-on state. Under the control of PWM or PFM used, upon arriving at the time point for turning on the switch transistor M1, the secondary-side control portion 20 ensures at the time point tee that the transistor M2 is in a turned-off state, and sends a reference signal CMD2 serving as the signal S2 (the reference signal CMD2 is referred to as a reference signal 231). In the example in FIG. 9, the SR transistor M2 is turned off at the time point $t_{C0}$; however, under the control of the secondary-side control portion 20, the SR transistor M2 may also be turned off according to voltage $V_A$ before the time point $t_{C0}$. The reference signal 231 is for providing an instruction for turning on the switch transistor M1. The primary-side control portion 10 immediately turns on the switch transistor M1 upon receiving the reference signal 231 (CMD2), and sends a response signal ACK1 serving as the signal S1 (the response signal ACK1 is to be referred to as a response signal 232). A time point $t_{C1}$ subsequent to the time point $t_{C0}$ represents a time point for turning on the switch transistor M1.

Then, under the control of PWM or PFM used, upon arriving at the time point for turning off the switch transistor M1, the secondary-side control portion 20 sends a reference signal CMD2 serving as the signal S2 (the reference signal CMD2 is referred to as a reference signal 233) at a time point $t_{C2}$. The reference signal 233 is for providing an instruction for turning off the switch transistor M1. The primary-side control portion 10 immediately turns off the switch transistor M1 upon receiving the reference signal 233 (CMD2), and sends a response signal ACK1 serving as the signal S1 (the response signal ACK1 is referred to as a response signal 234). A time point $t_{C3}$ subsequent to the time point $t_{C2}$ represents a time point for turning off the switch transistor M1.

The secondary-side control portion 20 turns on the SR transistor M2 in response to the response signal 234 received. The secondary-side control portion 20 does not turn on the SR transistor M2 but keeps the SR transistor M2 in a turned-off state, given that the response signal 234 is not received. The secondary-side control portion 20 may also turn on the SR transistor M2 only when the response signal 234 is received and upon detecting that the voltage $V_A$ is lower than the predetermined negative turn-on determination voltage (e.g., −100 mV). Later, upon arriving at the time point for turning on and the time point for turning off the switch transistor M1, the same actions are repeated.

Further, as described in the first embodiment, if the response signal ACK1 (232 and 234 in FIG. 9) is not received after having sent the reference signals CMD2 (231 and 233 in FIG. 9), the secondary-side control portion 20 may also perform a communication error process.

According to the embodiment EX2_3, the transistors M1 and M2 are reliably prevented from being turned on simultaneously, thereby enhancing safety of the DC/DC converter 1. Further, because the secondary-side control portion 20 capable of directly observing the secondary-side voltage $V_S$ is capable of controlling turn-on and turn-off of the switch transistor M1, compared to the method in which the primary-side control portion 10 controls turn-on and turn-off of the switch transistor M1 according to the feedback signal $V_{FB}$, the stability of the secondary-side voltage $V_S$ and the responding ability of a load device may be enhanced.

Third Embodiment

The third embodiment of the present invention is described below. The actions of the DC/DC converter 1 in the description associated with the first and second embodiments are fundamentally equivalent to the actions after the DC/DC converter 1 is activated normally (the normal actions mentioned below). In the third embodiment, actions of the DC/DC converter 1 after activation are described below.

Figure 10:
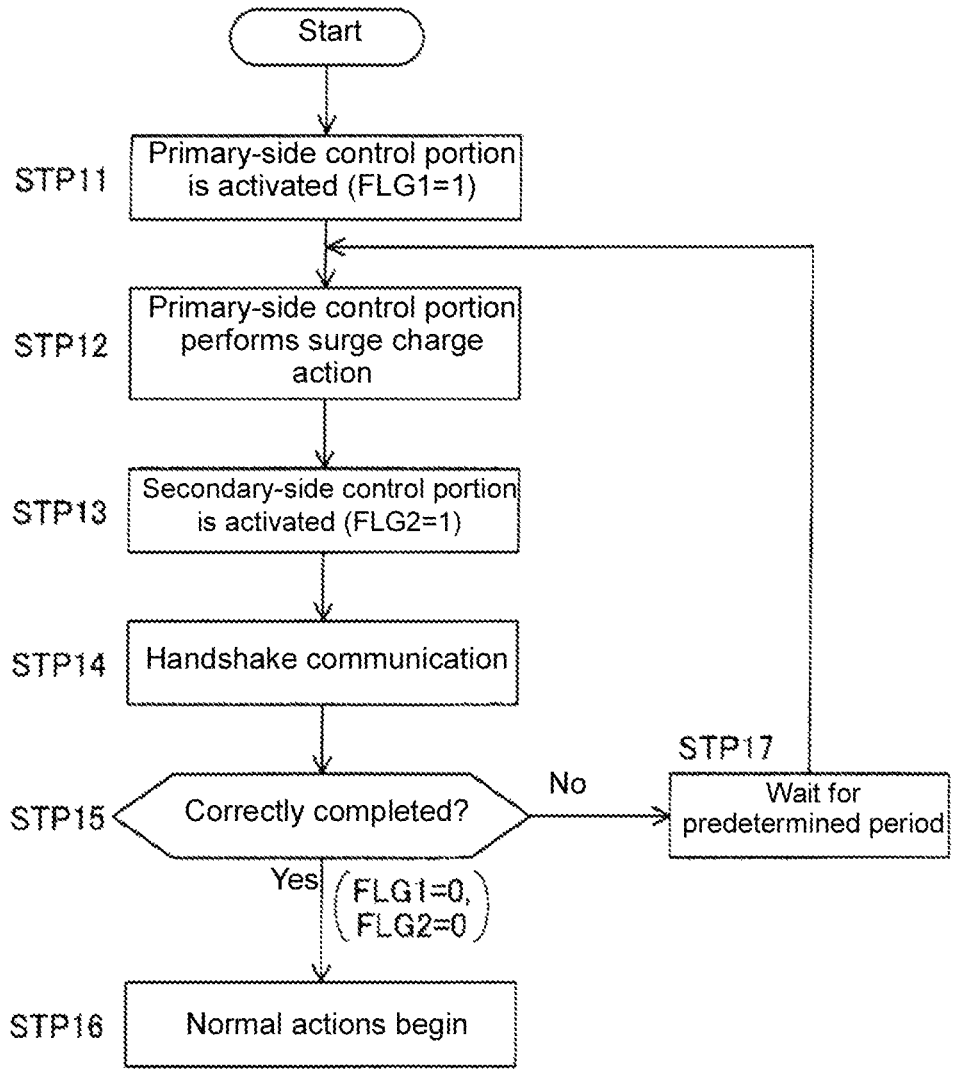
FIG. 10 is a flowchart of process of actions of activation of a DC/DC converter according to a third embodiment of the present invention.

FIG. 10 shows a flowchart of a process of actions of activation of the DC/DC converter 1. A state in which no voltage is inputted to the DC/DC converter 1 and the primary-side voltage $V_P$ and the secondary-side voltage $V_S$ are 0 V is regarded as a starting point. When a required voltage is inputted to the DC/DC converter 1 in step STP11

(that is to say, when the primary-side voltage $V_P$ rises up to a predetermined positive voltage), a power voltage VCC required is inputted to the primary-side control portion 10 after the activation of the primary-side power circuit 11, and the primary-side control portion 10 is thus activated. Soon after the primary-side control portion 10 is activated, the communication error flag FLG1 (referring to FIG. 3(*a*)) is set to "1".

Upon activation of the primary-side control portion 10, a surge charge action (an initialization action) of the primary-side control portion 10 may be performed in step STP12. In the surge charge action, the primary-side control portion 10 performs switch-driving of the switch transistor M1 regardless of the value of the secondary-side voltage $V_S$. That is to say, for example, in a structure in which turn-on and turn-off of the switch transistor M1 are controlled according to the feedback signal $V_{FB}$ in the normal actions as in the embodiment EX2_1 or EX2_2, switch-driving of the switch transistor M1 is performed regardless of the value of the feedback signal $V_{FB}$ in the surge charge action. Further, for example, in a structure in which turn-on and turn-off of the switch transistor M are controlled according to the reference signal CMD2 (the reference signal CMD2 based on the secondary-side voltage $V_S$) from the secondary-side control portion 20 in the normal actions as in the embodiment EX2_3, switch-driving of the switch transistor M1 is performed regardless of the value of the reference signal CMD2 in the surge charge action.

In the surge charge action, the signal corresponding to the current, i.e., the current detection signal $V_{CS}$, flowing in the switch transistor M1 may be used. That is to say, for example, in the surge charge action, at a time point at which the voltage value of the current detection signal $V_{CS}$ reaches a predetermined value after the primary-side control portion 10 turns on the switch transistor M1, a unit action of turning off the switch transistor M1 may be periodically and repeatedly performed. Upon having performed the unit action for a predetermined number of times or having repeatedly performed the unit action for a predetermined surge charge period, the surge charge action ends. Alternatively, the surge charge action may also be ended when the primary-side control portion 10 receives a secondary-side activation signal below.

When the secondary-side voltage $V_S$ rises to higher than a predetermined voltage by having performed the surge charge action, the secondary-side control portion 20 is activated in step STP13. Soon after the activation of the secondary-side control portion 20, the communication error flag FLG2 (referring to FIG. 3(*b*)) is set to "1". When the secondary-side control portion 20 is activated, the secondary-side control portion 20 may also send a predetermined secondary-side activation signal serving as the signal S2 to the primary-side control portion 10.

After the secondary-side control portion 20 is activated, handshake communication is performed in step STP14. The handshake communication may begin after the surge charge action ends, or may begin during the execution process of the surge charge action. In a structure in which the secondary-side activation signal is sent in conjunction with the activation of the secondary-side control portion 20, handshake communication may be performed as the secondary-side control portion 20 sends the secondary-side activation signal, or as the primary-side control portion 10 receives the secondary-side activation signal. Further, for example, handshake communication may also be performed by using a condition that the surge charge action is performed only at a fixed time point (in this case, a sending entity of the initial signal in the handshake communication is the primary-side control portion 10).

The handshake communication is formed by exchanging of more than one reciprocating signal between the primary-side control portion 10 and the secondary-side control portion 20 through the pulse transformer portion 30.

Figure 11:
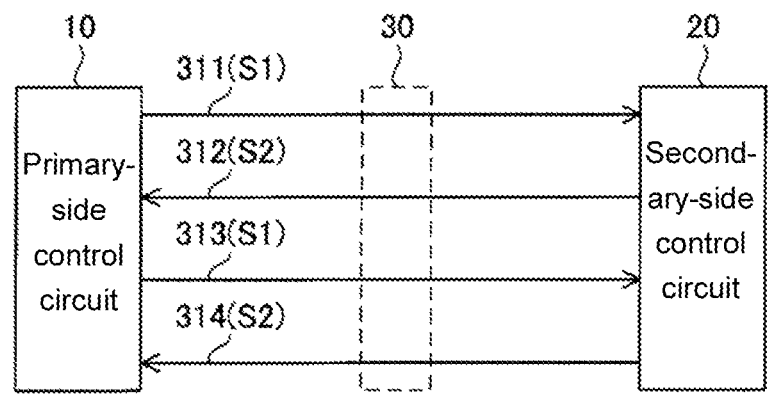
FIG. 11 is a diagram of an example of handshake communication according to the third embodiment of the present invention.

FIG. 11 shows a process of handshake communication HS1 as an example of handshake communication. The handshake communication HS1 is used when the primary-side control portion 10 is the master and the secondary-side control portion 20 is the slave (however, the handshake communication HS1 may also be performed when the secondary-side control portion 20 is the master).

In the handshake communication HS1 in FIG. 11, first, the primary-side control portion 10 sends a signal 311 as the signal S1 to the secondary-side control portion 20, the secondary-side control portion 20 receiving the signal 311 sends a signal 312 as the signal S2 to the primary-side control portion 10, the primary-side control portion 10 receiving the signal 312 sends a signal 313 as the signal S1 to the secondary-side control portion 20, and the secondary-side control portion 20 receiving the signal 313 sends a signal 314 as the signal S2 to the primary-side control portion 10. The signals 311 and 313 serve as the reference signal CMD1 to exercise a due function, and the signals 312 and 314 serve as the response signal ACK2 to exercise a due function. The handshake communication HS1 is correctly completed after the primary-side control portion 10 receives the signal 314. In a structure in which the secondary-side activation signal is sent in conjunction with the activation of the secondary-side control portion 20, the signal 311 may also be sent as the primary-side control portion 10 receives the secondary-side activation signal.

The signals 311 to 313 are check signals for determining whether bi-directional communication may be performed between the control portions 10 and 20. The primary-side control portion 10 may determine the bi-directional communication performed between the control portions 10 and 20 by receiving the signal 312. The secondary-side control portion 20 may determine the bi-directional communication performed between the control portions 10 and 20 by receiving the signals 311 and 313. The secondary-side control portion 20 sets the communication error flag FLG2 stored therein to "0" when it sends the signal 314, and the primary-side control portion 10 sets the communication error flag FLG1 stored therein to "0" when it receives the signal 314. Thus, the flags FLG1 and FLG2 are respectively set to "0" in a phase in which the handshake communication HS1 is correctly completed. The two parties having the flags FLG1 and FLG2 set to "0" indicate that the bi-directional communication between the control portions 10 and 20 may be normally performed.

Figure 12:
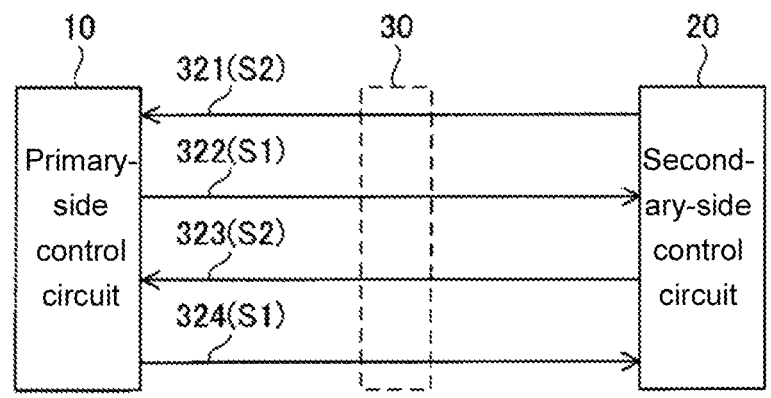
FIG. 12 is a diagram of another example of handshake communication according to the third embodiment of the present invention.

FIG. 12 shows a process of handshake communication HS2 as another example of handshake communication. The handshake communication HS2 is used when the secondary-side control portion 20 is the master and the primary-side control portion 10 is the slave (however, the handshake communication HS2 may also be performed when the primary-side control portion 10 is the master).

In the handshake communication HS2 in FIG. 12, first, first, the secondary-side control portion 20 sends a signal 321 as the signal S2 to the primary-side control portion 10, the primary-side control portion 10 receiving the signal 321 sends a signal 322 as the signal S to the secondary-side control portion 20, the secondary-side control portion 20 receiving the signal 322 sends a signal 323 as the signal S2 to the primary-side control portion 10, and the primary-side control portion 10 receiving the signal 323 sends a signal 324 as the signal S1 to the secondary-side control portion 20. The signals 321 and 323 serve as the reference signal CMD2 to exercise a due function, and the signals 322 and 324 serve as the response signal ACK1 to exercise a due function. The handshake communication HS2 is correctly completed after the secondary-side control portion 20 receives the signal 324. In a structure in which the secondary-side activation signal is sent in conjunction with the activation of the secondary-side control portion 20, the secondary-side activation signal may also serve as the signal 321 to exercise a due function.

The signals 321 to 323 are check signals for determining whether bi-directional communication may be performed between the control portions 10 and 20. The secondary-side control portion 20 may determine the bi-directional communication performed between the control portions 10 and 20 by receiving the signal 322. The primary-side control portion 10 may determine the bi-directional communication performed between the control portions 10 and 20 by receiving the signals 321 and 323. The primary-side control portion 10 sets the communication error flag FLG1 stored therein to "0" when it sends the signal 324, and the secondary-side control portion 20 sets the communication error flag FLG2 stored therein to "0" when it receives the signal 324. Thus, the flags FLG1 and FLG2 are respectively set to "0" in a phase in which the handshake communication HS2 is correctly completed.

Further description is given again with reference to FIG. 10. Step STP16 is performed after the handshake communication (e.g., HS1 or HS2) is correctly completed, and normal actions begin. That is to say, switch-driving of the switch transistor M1 for stabilizing the secondary-side voltage $V_S$ toward the target voltage $V_{TG}$ with reference to the secondary-side voltage $V_S$ as described in the first or second embodiment begins. For example, actions for controlling turn-on and turn-off of the transistors M1 and M2 included in the embodiment EX2_1, EX2_2 or EX2_3 are regarded normal actions and are begun. Further, before the normal actions begin in step STP16, the SR transistor M2 is kept turned off.

On the other hand, before the handshake communication is correctly completed, the normal actions do not begin and step STP17 is performed from step STP15. In step STP17, the switch transistor M1 is kept in a turned-off state for a predetermined period by using the primary-side control portion 10, and then the process returns to step STP12 to again perform the surge charge action. Further, step STP12 may not be repeated after step STP17 is performed, and the power voltage VCC supplied to the primary-side control portion 10 may be interrupted to maintain the turned-off state of the transistor M1 (in this case, plugging/unplugging of a plug of the DC/DC converter 1 needs to be again activated if the primary-side voltage $V_P$ is generated according to a commercial AC voltage supplied by the plug).

For example, when the handshake communication HS1 in FIG. 11 is performed, if the primary-side control portion 10 does not receive the signal 312 after a predetermined period subsequent to having sent the signal 311, or if the primary-side control portion 10 does not receive the signal 314 after a predetermined period subsequent to having sent the signal 313, it is determined that the handshake communication is not correctly completed, and step STP17 is performed from step STP15.

Alternatively, for example, when the handshake communication HS2 in FIG. 12 is performed, if the primary-side control portion 10 does not receive the signal 323 after a predetermined period subsequent to having sent the signal 322, it is determined that the handshake communication is not correctly completed, and step STP17 is performed from step STP15.

Further, for example, when the handshake communication HS2 in FIG. 12 is performed, if the secondary-side control portion 20 does not receive the signal 322 after a predetermined period subsequent to having sent the signal 321, or if the secondary-side control portion 20 does not receive the signal 324 after a predetermined period subsequent to having sent the signal 323, the bi-directional communication cannot correctly exercise a due function, and the secondary-side control portion 20 cannot learn the state of the primary-side circuit. At this point, the communication error flag FLG2 is set to "1", and thus the SR transistor M2 does not become a turned-on state so as to prevent the transistors M1 and M2 from being turned on simultaneously. Further, at this point, if the secondary-side control portion 20 is the master, the switch transistor M1 is not turned on when the method of the embodiment EX2_3 is used, such that the communication error process is promptly performed to ensure that the transistors M1 and M2 are in a turned-off state, even when the primary-side control portion 10 is the master.

Using the method described above, normal actions may begin while guaranteeing the normal state of bi-directional communication. That is to say, normal actions are prohibited in a condition where bi-directional communication is incomplete, thus preventing unexpected situations associated with safety.

Further, after the primary-side control portion 10 is activated, if certain abnormality is detected in the primary-side control portion 10, the primary-control portion 10 may send a signal indicating the subject in the handshake communication to the secondary-side control portion 10, and then step STP17 may then be performed in this case. Similarly, for example, after the secondary-side control portion 20 is activated, if certain abnormality is detected in the secondary-side control portion 20, the secondary-control portion 20 may send a signal indicating the subject in the handshake communication to the primary-side control portion 10, and then step STP17 may similarly be performed in this case. Further, the abnormality is described in other embodiments below.

When abnormality occurs in one of the control portions 10 and 20, normal actions (e.g., switch-driving of the switch transistor M1, or controlling turn-on and turn-off of the SR transistor M2) whether the abnormality occurs in the other are preferably not performed, because the DC/DC converter 1 or a load device thereof may be degraded or damaged as a result of the content of the abnormality. Such undesirable situation may be prevented according to the method above.

Fourth Embodiment

The fourth embodiment of the present invention is described below. In the fourth embodiment, reactive measures for handling abnormality occurring in the primary-side control portion 10 or the secondary-side control portion 20 are described.

Figure 13:
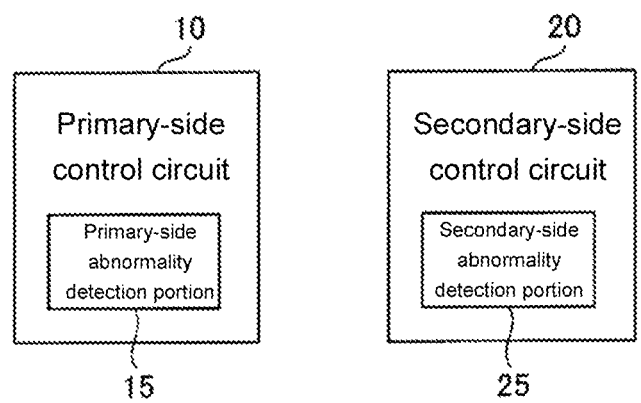
FIG. 13 is a diagram of situations of respectively disposing abnormality detection portions at the primary-side control portion and the secondary-side control portion according to a fourth embodiment of the present invention.

As shown in FIG. 13, a primary-side abnormality detection portion 15 for detecting whether abnormality exists in the primary-side circuit (particularly, for example, in the primary-side control portion 10) is provided in the primary-side control portion 10, and a secondary-side abnormality detection portion 25 for detecting whether abnormality exists in the secondary-side circuit (particularly, for example, in the secondary-side control portion 20) is provided in the secondary-side control portion 20.

The primary-side abnormality detection portion 15 may also individually detect multiple types of abnormality. Examples of abnormality detectable to the primary-side abnormality detection portion 15 include primary-side overheat abnormality, primary-side over-voltage abnormality, primary-side under-voltage abnormality, current sensing abnormality and incomplete turn-off abnormality.

The primary-side overheat abnormality refers to a state in which the temperature of the primary-side control portion 10 or the temperature of the switch transistor M1 becomes higher than a predetermined temperature T1_UL. The abnormality detection portion 15 may use a temperature sensor to detect whether primary-side overheat abnormality exists, and the temperature sensor outputs a signal corresponding to the temperature of the primary-side control portion 15 or the temperature of the switch transistor M1.

The primary-side over-voltage abnormality and the primary-side under-voltage abnormality respectively refer to a state in which the primary-side voltage $V_P$ becomes higher than a predetermined upper voltage limit VP_UL and a state in which the primary-side voltage $V_P$ becomes lower than a predetermined lower voltage limit VP_LL. The primary-side control portion 10 may detect, according to the primary-side voltage $V_P$ or a divided voltage of primary-side voltage $V_P$, whether the primary-side over-voltage abnormality or the primary-side under-voltage abnormality exists. Further, considering a transition period of the primary-side voltage $V_P$, after the primary-side control portion 10 is activated, the primary-side under-voltage abnormality may also be left undetected within a certain time period.

The current sensing abnormality refers to a state in which the value of the current detection signal $V_{CS}$ (that is, the voltage drop of the sensing resistor $R_{CS}$) becomes lower than a predetermined threshold $V_{CS1}$ (the transistor M1 is turned on at this point) after a predetermined period subsequent to having turned on the switch transistor M1. The current sensing abnormality may be detected when the sensing resistor $R_{CS}$ is short-circuited.

The incomplete turn-off abnormality refers to a state in which the value of the current detection signal $V_{CS}$ (i.e., the voltage drop of the sensing resistor $R_{CS}$) is higher than a predetermined threshold although the switch transistor M1 is controlled to be turned off (although the gate voltage of the transistor M1 is a low level). The incomplete turn-off abnormality may be detected when the drain-source of the transistor M1 is short-circuited.

The secondary-side abnormality detection portion 25 may also individually detect multiple types of abnormality. Examples of abnormality detectable to the secondary-side abnormality detection portion 25 include secondary-side overheat abnormality, secondary-side over-voltage abnormality, and secondary-side under-voltage abnormality.

The secondary-side overheat abnormality refers to a state in which the temperature of the secondary-side control portion 20 or the temperature of the SR transistor M2 becomes higher than a predetermined temperature T2_UL. The abnormality detection portion 25 may use a temperature sensor to detect whether the secondary-side overheat abnormality exists, and the temperature sensor outputs a signal corresponding to the temperature of the secondary-side control portion 20 or the temperature of the SR transistor M2.

The secondary-side over-voltage abnormality and the secondary-side under-voltage abnormality respectively refer to a state in which the secondary-side voltage $V_S$ becomes higher than a predetermined upper voltage limit VS_UL and a state in which the secondary-side voltage $V_S$ becomes lower than a predetermined lower voltage limit VS_LL. The secondary-side control portion 20 may detect, according to the secondary-side voltage $V_S$ (according to the voltage $V_B$ in the structure in FIG. 1), whether the secondary-side over-voltage abnormality or the secondary-side under-voltage abnormality exists. In a stable state, the secondary-side over-voltage abnormality or the secondary-side under-voltage abnormality should not occur, however, such abnormality may occur due to malfunction of certain components. Further, considering a transition period of the secondary-side voltage $V_S$, after the secondary-side control portion 20 is activated, the secondary-side under-voltage abnormality may also be left undetected within a certain time period.

In the embodiments EX4_1 to EX4_4 included in the fourth embodiment, examples of actions when abnormality is detected by the abnormality detection portion 15 or 25 are described. Further, the actions illustrated in the embodiments EX4_1 to EX4_4 may also be understood as actions after the normal actions have begun. Further, the abnormality detected refers to in specifically that abnormality has been detected.

Embodiment EX4_1

The embodiment EX4_1 is described below. In the embodiment EX4_1, it is assumed that the primary-side control portion 10 is the master and the secondary-side control portion 20 is the slave, and the primary-side abnormality detection portion 15 detects any abnormality (for illustration purposes, the abnormality is referred to as abnormality AB1).

Actions of the primary-side control portion 10 when the abnormality AB1 is detected are described. When the abnormality AB1 is detected, the primary-side control portion 10 stops switch-driving of the switch transistor M1. The so-called stopping of the switch transistor M1 refers to immediately keeping the transistor M1 in a turned-off state if the transistor M1 is in a turned-on state, and directly keeping the transistor M1 in a turned-off state if the transistor M1 is already in a turned-off state. The stopping of the switch-driving of the transistor M1 is continued until the abnormality AB1 detected has been eliminated. Further, when the abnormality AB1 is detected, the primary-side control portion 10 sends an abnormality detection signal S1 (a primary-side abnormality detection signal) indicating the abnormality AB1 detected to the secondary-side control portion 20, and sending of the signals for implementing normal actions is stopped. The stopping of the sending of the signals for implementing normal actions refers to not sending the reference signal CMD1 (211, 213 and 211*a* in FIG. 5 and FIG. 6) when the embodiment EX2_1 is used, and not sending the reference signal CMD1 (221, 223 and 221*a* in FIG. 7 and FIG. 8) when the embodiment EX2_2 is used.

After having detected the abnormality AB1, the abnormality detection portion 15 is used to monitor whether the abnormality AB1 is eliminated, and upon detecting that the abnormality AB1 is eliminated, the primary-side control portion 10 sends a predetermined restoring signal S1 to the secondary-side control portion 20. Then, after a predetermined time period, if a response signal from the secondary-side control portion 20 in response to the restoring signal S1 is received by the primary-side control portion 10, the primary-side control portion 10 may then again start the normal actions. On the other hand, after the predetermined time period, if the response signal from the secondary-side control portion 20 in response to the restoring signal S1 is not received by the primary-side control portion 10, it is considered that the secondary-side voltage $V_S$ has dropped to a level at which driving of the secondary-side control portion 20 is stopped, and thus the primary-side control portion 10 may perform the process described in the third embodiment from the surge charge action of step STP12 in FIG. 10.

Actions of the secondary-side control portion 20 when the abnormality AB1 is detected are described. When the secondary-side control portion 20 receives the abnormality detection signal S1 indicating the abnormality AB1, it sends a response signal in response to the signal received to the primary-side control portion 10, ensures a turned-off state of the SR transistor M2, and then waits for the restoring signal sent from the primary-side control portion 10. During the process of waiting, driving of the secondary-side control portion 20 is stopped when the secondary-side voltage $V_S$ drops to lower than a predetermined reset voltage.

Embodiment EX4_2

The embodiment EX4_2 is described below. In the embodiment EX4_2, it is assumed that the secondary-side control portion 20 is the master and the primary-side control portion 10 is the slave, and any abnormality AB1 is detected by the primary-side abnormality detection portion 15.

Actions of the primary-side control portion 10 when the abnormality AB1 is detected are described below. When the abnormality AB1 is detected, the primary-side control portion 10 stops switch-driving of the switch transistor M1. Switch-driving of the switch transistor M1 is stopped until it is detected that the abnormality AB1 is eliminated. Further, when the abnormality AB1 is detected, the primary-side control portion 10 sends an abnormality detection signal S1 (a primary-side abnormality detection signal) indicating the abnormality AB1 to the secondary-side control portion 20.

After having detected the abnormality AB1, the abnormality detection portion 15 is used to monitor whether the abnormality AB1 is eliminated, and upon detecting that the abnormality AB1 is eliminated, the primary-side control portion 10 sends a predetermined restoring signal S1 to the secondary-side control portion 20. Next, after a predetermined time period, if a response signal from the secondary-side control portion 20 in response to the restoring signal S1 is received by the primary-side control portion 10, the stopping of the switch-driving of the switch transistor M1 is removed, and the switch-driving may again begin under the control of the secondary-side control portion 20 serving as the master. On the other hand, after the predetermined time period, if the response signal from the secondary-side control portion 20 in response to the restoring signal S1 is not received by the primary-side control portion 10, it is considered that the secondary-side voltage $V_S$ has dropped to a level at which driving of the secondary-side control portion 20 is stopped, and thus the primary-side control portion 10 may perform the process described in the third embodiment from the surge charge action of step STP12 in FIG. 10.

Actions of the secondary-side control portion 20 when the abnormality AB1 is detected are described. When the secondary-side control portion 20 receives the abnormality detection signal S1 indicating the abnormality AB1, it sends a response signal in response to the signal received to the primary-side control portion 10, ensures a turned-off state of the SR transistor M2, stops sending of signals for implementing normal actions, and then waits for the restoring signal sent from the primary-side control portion 10. The so-called stopping of the signals for implementing the normal actions refers to not sending the reference signal CMD2 (231 and 233 in FIG. 9) when the embodiment EX2_3 is used. During the process of waiting, driving of the secondary-side control portion 20 is stopped when the secondary-side voltage $V_S$ drops to lower than a predetermined reset voltage.

Embodiment EX4_3

The embodiment EX4_3 is described below. In the embodiment EX4_3, it is assumed that the primary-side control portion 10 is the master and the secondary-side control portion 20 is the slave, and any abnormality is detected by the secondary-side abnormality detection portion 25 (for illustration purposes, the abnormality is referred to as abnormality AB2).

Actions of the secondary-side control portion 20 when the abnormality AB2 is detected are described below. When the abnormality AB2 is detected, the secondary-side control portion 20 ensures a turned-off state of the SR transistor M2, and the keeps a turned-off state of the SR transistor M2 given that elimination of the abnormality AB2 is not detected later. Further, when the abnormality AB2 is detected, the secondary-side control portion 20 sends an abnormality detection signal S2 (a secondary-side abnormality detection signal) indicating the abnormality AB2 to the primary-side control portion 10.

After having detected the abnormality AB2, the abnormality detection portion 25 is used to monitor whether the abnormality AB2 is eliminated, and the secondary-side control portion 20 sends a predetermined restoring signal S2 to the primary-side control portion 10 upon detecting that the abnormality AB2 is eliminated. When no abnormality AB2 is detected and the secondary-side voltage $V_S$ drops to lower than a predetermined reset voltage, driving of the secondary-side control portion 20 is stopped.

Actions of primary-side control portion 10 when the abnormality AB2 is detected are described below. When the primary-side control portion 10 receives the abnormality detection signal S2 from the secondary-side control portion 20, it sends a response signal in response to the signal received to the secondary-side control portion 20, stops switch-driving of the switch transistor M1, and in conjunction stops sending signals for implementing normal actions. The so-called stopping of the signals for implementing normal actions refers to not sending the reference signal CMD1 (211, 213 and 211a in FIG. 5 and FIG. 6) when the embodiment EX2_1 is used, and not sending the reference signal CMD1 (221, 223 and 221a in FIG. 7 and FIG. 8) when the embodiment EX2_2 is used.

The stopping of the switch-driving of the switch transistor M is in principle continued until the restoring signal S2 from the secondary-side control portion 20 is received. However, after receiving the abnormality detection signal S2, even if the restoring signal S2 is not received after a predetermined time period, it is considered that the secondary-side voltage $V_S$ has dropped to a level at which the driving of the secondary-side control portion 20 is stopped, and thus the primary-side control portion 10 may perform the process described in the third embodiment from the surge charge action of step STP12 in FIG. 10.

Embodiment EX4_4

The embodiment EX4_4 is described below. In the embodiment EX4_4, it is assumed that the secondary-side control portion 20 is the master and the primary-side control portion 10 is the slave, and any abnormality AB2 is detected by the secondary-side abnormality detection portion 25.

Actions of the secondary-side control portion 20 when the abnormality AB2 is detected are described below. When the abnormality AB2 is detected, the secondary-side control portion 20 ensures a turned-off state of the SR transistor M2, and the keeps a turned-off state of the SR transistor M2 given that elimination of the abnormality AB2 is not detected later. Further, upon having detected the abnormality AB2, the secondary-side control portion 20 sends a predetermined abnormality detection signal S2 (a secondary-side abnormality detection signal) indicating the abnormality AB2 detected to the primary-side control portion 10, and then stops sending signals implementing normal actions. The so-called stopping of the signals for implementing the normal actions refers to not sending the reference signal CMD2 (231 and 233 in FIG. 9) when the embodiment EX2_3 is used.

After having detected the abnormality AB2, the abnormality detection portion 25 is used to monitor whether the abnormality AB2 is eliminated, and the secondary-side control portion 20 sends a predetermined restoring signal S2 to the primary-side control portion 10 upon detecting that the abnormality AB2 is eliminated. When no abnormality AB2 is detected and the secondary-side voltage $V_S$ drops to lower than a predetermined reset voltage, driving of the secondary-side control portion 20 is stopped.

Actions of primary-side control portion 10 when the abnormality AB2 is detected are described below. When the primary-side control portion 10 receives the abnormality detection signal S2 from the secondary-side control portion 20, it sends a response signal in response to the signal received to the secondary-side control portion 20, and stops switch-driving of the switch transistor M1.

The stopping of the switch transistor M1 is in principle continued until the primary-side control portion 10 receives the restoring signal S2 from the secondary-side control portion 20. However, after receiving the abnormality detection signal S2, even if the restoring signal S2 is not received after a predetermined time period, it is considered that the secondary-side voltage $V_S$ has dropped to a level at which the driving of the secondary-side control portion 20 is stopped, and thus the primary-side control portion 10 may perform the process described in the third embodiment from the surge charge action of step STP12 in FIG. 10.

Further, under any situation of the embodiments EX4_1 to EX4_4, after the abnormality AB1 or AB2 is temporarily detected, a turned-off state of the transistors M1 and M2 may also be continued until the power voltage VCC supplied to the primary-side control portion 10 is interrupted (in this case, plugging/unplugging of a plug of the DC/DC converter 1 needs to be again activated if the primary-side voltage $V_P$ is generated according to a commercial AC voltage supplied by the plug).

Fifth Embodiment

The fifth embodiment of the present invention is described below. The structure of an insulation synchronous rectification-type DC/DC converter serving as the DC/DC converter 1 is described. However, the DC/DC converter 1 of the present invention may be any insulation-type DC/DC converter in which the primary-side voltage $V_P$ applied to the primary-side winding W1 generates the secondary-side voltage $V_S$ on the secondary side of the transformer TR.

For example, in the DC/DC converter 1 shown in FIG. 1, a so-called low-end application is used; however, a high-end application may also be used. In the DC/DC converter 1 using a high-end application, the SR transistor M2 is provided on the side of the output terminal $TM_{2A}$, and the SR transistor M2 is connected in series between the output terminal $TM_{2A}$ applied with the secondary-side voltage $V_S$ and the secondary-side winding W2 of the transformer TR. Further, without compromising the form of the subject matter of the present invention, the position for disposing the SR transistor M2 in the secondary-side circuit may be modified.

Further, for example, the DC/DC converter 1 may also be implemented by a DC/DC converter using a rectification diode (an insulation diode rectification-type DC/DC converter). In this case, in the DC/DC converter 1, the rectification diode is disposed at the secondary-side circuit, in substitution for the SR transistor M1 and the parasitic diode D2 in FIG. 1. The rectification diode placed between the secondary-side winding W2 and the capacitor C2, and performs rectification on power transmitted from the primary-side winding W1 to the secondary-side winding W2. When the DC/DC converter 1 is structured as the diode rectification-type DC/DC converter, the description associated with the control for the SR transistor M2 in the first to fourth embodiment is omitted.

Further, for example, the DC/DC converter 1 may also be structured as a forward insulation-type DC/DC converter. In this case, any one of a synchronous rectification type or the diode rectification type may be used.

Sixth Embodiment

The sixth embodiment of the present invention is described below. In the sixth embodiment, the purpose of the insulation-type DC/DC converter is described.

Figure 14:
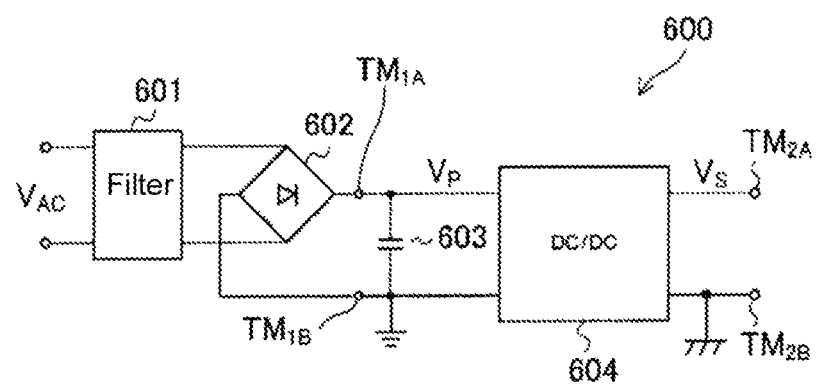
FIG. 14 is a structural diagram of an AC/DC converter according to a sixth embodiment of the present invention.

As shown in FIG. 14, the structure of the insulation-type DC/DC converter of the present invention may be used to form an AC/DC converter 600. The AC/DC converter 600 includes a filter 601, a rectification circuit 602, a smoothing capacitor 603 and an insulation-type DC/DC converter 604. The filter 601 removes noise from an AC voltage $V_{AC}$ inputted to the AC/DC converter 600. The AC voltage $V_{AC}$ may also be a commercial AC voltage. The rectification circuit 602 is a diode bridge circuit that performs full-wave rectification on the AC voltage $V_{AC}$ supplied from the filter 601. The smoothing capacitor 603 smooths the voltage having undergone full-wave rectification to generate a DC voltage. The insulation-type DC/DC converter 604 receives the DC voltage generated by the smoothing capacitor 603 as the primary-side voltage $V_P$, and causes the primary-side voltage $V_P$ to undergo power conversion (DC-DC conversion) to generate the secondary-side voltage $V_S$. The secondary-side voltage $V_S$ is equivalent to the output voltage of the AC/DC converter 600. The DC/DC converter 1 of any one of the first to fifth embodiments may be used as the insulation-type DC/DC converter 604. In this case, the capacitor C1 in FIG. 1 is equivalent to the smoothing capacitor 603.

Figure 15:
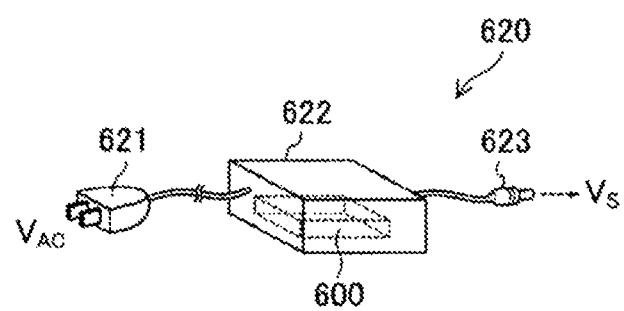
FIG. 15 is a structural diagram of a power adapter according to a sixth embodiment of the present invention.

The AC/DC converter 600 may also be used to form a power adapter. FIG. 15 shows a diagram of a power adapter 620 including the AC/DC converter 600. The power adapter 620 includes the AC/DC converter 600, a plug 621, a housing 622 and an output connector 623, and the AC/DC converter 600 is accommodated and disposed in the housing 622. The plug 621 receives the commercial AC voltage $V_{AC}$ from the plug that is not shown, and the AC/DC converter 600 generates the DC secondary-side voltage $V_S$ from the commercial AC voltage $V_{AC}$ inputted from the plug. The secondary-side voltage $V_S$ is supplied through the output connector 623 to any electronic device that is not shown in the diagram. For example, the electronic device is a laptop personal computer, an information terminal device, a digital camera, a digital video camera, a mobile phone (including a mobile phone categorized as a smartphone), and a portable audio player.

Figure 16:
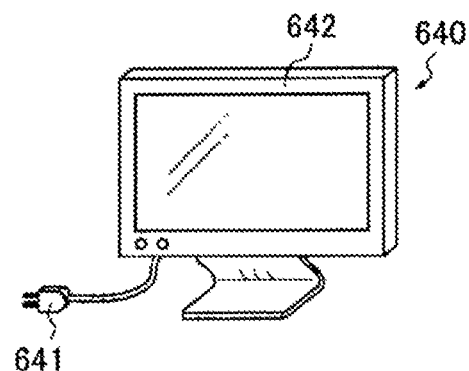
FIGS. 16(a) and (b) are structural diagrams of an electronic device according to the sixth embodiment of the present invention.
Figure 16:
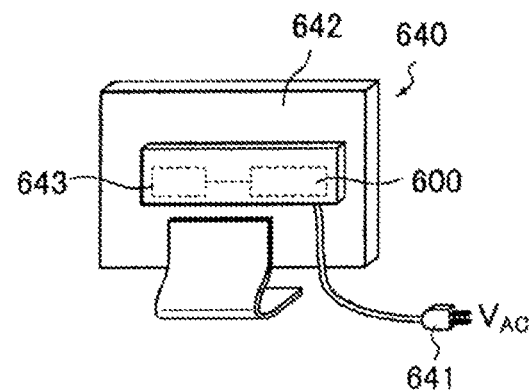

An electronic device including the AC/DC adapter may also be formed. FIGS. 16(a) and (b) show diagrams of an electronic device 640 including the AC/DC converter 600. The electronic device 640 shown in FIGS. 16(a) and (b) is a display device; however, the type of the electronic device 640 is not specifically limited, and may be any machine built-in with an AC/DC converter, such as a video/audio apparatus, a refrigerator, a washing machine or a vacuum cleaner. The electronic device 640 includes the AC/DC converter 600, a plug 641, a housing 642 and a load device 643, and the AC/DC converter 600 and the load device 643 are accommodated and disposed in the housing 642. The plug 641 receives the commercial AC voltage $V_{AC}$ from a plug that is not shown, and the AC/DC converter 600 generates the DC secondary-side voltage $V_S$ from the commercial AC voltage $V_{AC}$ inputted from the plug 641. The secondary-side voltage $V_S$ generated is supplied to the load device 643. The load device 643 may be any load device driven based on the secondary-side voltage $V_S$, for example, a microcomputer, a digital signal processor (DSP), a power circuit, a lighting machine, an analog circuit or a digital circuit.

Seventh Embodiment

The seventh embodiment is described below. In the seventh embodiment, application techniques and variation techniques applicable to the first to sixth embodiments are described.

In the structure in FIG. 1, the function of sending information corresponding to the secondary-side voltage $V_S$ to the primary-control side 10 may be implemented by using the optocoupler 41; however, the function may also be implemented by using the pulse transformer portion 30. In this case, the feedback circuit 40 and the optocoupler 41 may be omitted from the structure in FIG. 1. That is to say, for example, the secondary-side control portion 20 may also send the signal S2 including information corresponding to the secondary-side voltage $V_S$ through the pulse transformer portion 30 to the primary-side control portion 10.

An exemplary structure of the pulse transformer portion 30 including two pulse transformers is described (referring to FIG. 2); however, the quantity of pulse transformer provided in the pulse transformer portion 30 may be one, and bi-directional communication between the control portions 10 and 20 may be implemented by one pulse transformer in a time-division manner. The method of achieving bi-directional communication by using one pulse transformer may include any method of known methods (e.g., the method stated in Japan Patent Publication No. 2007-209082).

A semiconductor device SMC1 may be formed by integrating the primary-side control portion 10, the secondary-side control portion 20 and the pulse transformer portion 30 into one chip on a semiconductor substrate. The semiconductor device SMC1 is formed by integrating the primary-side control portion 10, the secondary-side control portion 20 and the pulse transformer portion 30, and accommodating and sealing the same in a package (housing) formed by resin.

Alternatively, a first chip formed by integrating the primary-side control portion 10 on a first semiconductor substrate, a second chip formed by integrating the secondary-side control portion 20 on a second semiconductor substrate, and a third chip formed by integrating the pulse transformer portion 30 on a third semiconductor substrate may be manufactured, and the first to third chips are accommodated and sealed in a common package (housing) to form a semiconductor device SMC2.

However, the primary-side control portion 10 and the secondary-side control portion 20 may also be formed as separate semiconductor devices. That is to say, the first chip formed by integrating the primary-side control portion 10 on the first semiconductor substrate is accommodated and sealed in a first package to form a semiconductor device SMC3A, and in a separate manner, the second chip formed by integrating the secondary-side control portion 20 on the second semiconductor substrate is accommodated and sealed in a second package to form a semiconductor device SMC3B. In this case, the pulse transformer portion 30 may also be a discrete component separately provided from the semiconductor devices SCM3A and SCM3B; however, the pulse transformer portion 30 may also be integrated as a third chip on a third semiconductor substrate, and be accommodated and sealed in a third package to form a semiconductor device SMC3C. In the semiconductor devices SCM3A. SCM3B and SMC3C, existing integrated circuit processes may be used to form the pulse transformer.

Alternatively, a semiconductor device ($SCM_{3A}$, $SCM_{3B}$ or $SMC_{3C}$) integrating the primary-side control portion 10 may be integrated to include the switch transistor M1, or be integrated to include the sensing resistor $R_{CS}$.

Alternatively, a semiconductor device ($SCM_{3A}$, $SCM_{3B}$ or $SMC_{3C}$) integrating the secondary-side control portion 20 may be integrated to include the SR transistor M2, may be further integrated to include the voltage dividing resistors R1 and R2, and may be further integrated to include the voltage dividing resistors R3 and R4.

Without compromising the form of the subject matter, the relationship between a high level and a low level of any signal or voltage may be the opposite. Further, without compromising the form of the subject matter, the channel type of the FET may be modified as desired.

Each of the transistors may be any type of transistor. For example, a transistor serving as the MOSFET may be replaced by a junction-type FET, an insulated gate bipolar transistor, or a bipolar transistor. Any transistor may include a first electrode, a second electrode and a control electrode. In an FET, one of the first and second electrodes is a drain and the other is a source, and the control electrode is a gate. In an IGBT, one of the first and second electrodes is a collector and the other is an emitter, and the control electrode is a gate. In a bipolar transistor that is not an IGBT, one of the first and second electrodes is a collector and the other is an emitter, and the control electrode is a base.

Various modifications within the scope of the inventive concept demonstrated in the claims may be appropriately made to the embodiments of the present invention. The embodiments above are merely examples of the embodiments of the present invention, and meanings of the terms of the components and elements of the present invention are not limited to the meanings stated in the embodiments above. The specific values given in the description are purely examples, and may be modified to various other values.

What is claimed is:

1. An insulation-type DC/DC converter, configured to mutually insulate a secondary-side circuit disposed on a secondary side and a primary-side circuit disposed on a primary side of a power transformer and to perform switch-driving of a switch transistor connected to a primary-side winding of the power transformer, such that the secondary-side circuit obtains a secondary-side voltage from a primary-side voltage in the primary-side circuit; the insulation-type DC/DC converter comprising:
   a primary-side control portion, disposed at the primary side, controlling the switch transistor;
   a secondary-side control portion, disposed at the secondary side; and
   a communication transformer, implementing bi-directional communication between the primary-side control portion and the secondary-side control portion,
   wherein the insulation-type DC/DC converter is an insulation synchronous rectification-type DC/DC converter and the insulation-type DC/DC converter controls a synchronous rectification transistor by the secondary-side control portion, wherein the synchronous rectification transistor is disposed at the secondary side so as to implement synchronous rectification, and transceives signals associated with turn-on and turn-off of the switch transistor between the primary-side control portion and the secondary-side control portion through the communication transformer,
   wherein the primary-side control portion sends a predetermined first signal to the secondary-side control portion through the communication transformer when the switch transistor is turned on, and sends a predetermined second signal to the secondary-side control portion through the communication transformer when the switch transistor is turned off, and the secondary-side control portion controls turn-on/turn-off of the synchronous rectification transistor according to the predetermined first signal and the predetermined second signal received.

2. The insulation-type DC/DC converter according to claim 1, wherein:
   the secondary-side control portion is configured to send a predetermined first response signal to the primary-side control portion through the communication transformer in response to the predetermined first signal received, and to send a predetermined second response signal to the primary-side control portion through the communication transformer in response to the predetermined second signal received; and
   the primary-side control portion performs, upon not receiving the predetermined first response signal after having sent the predetermined first signal, or upon not receiving the predetermined second response signal after having sent the predetermined second signal, a predetermined communication error process, which includes a process of prohibiting setting the switch transistor to a turned-on state.

3. The insulation-type DC/DC converter according to claim 1, wherein:
   the secondary-side control portion is capable of sending a predetermined first signal and a predetermined second signal to the primary-side control portion through the communication transformer, wherein the first predetermined signal provides an instruction for turning on the switch transistor and the predetermined second signal provides an instruction for turning off the switch transistor; and
   the primary-side control portion turns on the switch transistor in response to the predetermined first signal received, and turns off the switch transistor in response to the predetermined second signal received.

4. The insulation-type DC/DC converter according to claim 3, wherein:
   the primary-side control portion is configured to send a predetermined first response signal to the secondary-side control portion through the communication transformer in response to the predetermined first signal received, and to send a predetermined second response signal to the secondary-side control portion through the communication transformer in response to the predetermined second signal received; and
   the secondary-side control portion performs, upon not receiving the predetermined first response signal after having sent the predetermined first signal, or upon not receiving the predetermined second response signal after having sent the predetermined second signal, a predetermined communication error process, which includes a process of prohibiting setting the synchronous rectification transistor to a turned-on state.

5. The insulation-type DC/DC converter according to claim 1, wherein:
   upon starting to power the primary-side control portion and activation of the primary-side control portion, an initial action is performed regardless of a value of the primary-side voltage, to perform switch-driving of the switch transistor;
   when the secondary-side voltage becomes a predetermined voltage and the secondary-side control portion is activated after the initial action is undertaken, predetermined handshake communication is performed between the primary-side control portion and the secondary-side control portion through the communication transformer; and
   a normal action is performed after the handshake communication is correctly completed, and switch-driving of the switch transistor is performed according to the secondary-side voltage.

6. The insulation-type DC/DC converter according to claim 1, wherein:
   the primary-side control portion comprises a primary-side abnormality detection portion for detecting whether predetermined abnormality exists in the primary-side circuit; and
   if the abnormality is detected in the primary-side circuit, switch-driving of the switch transistor is stopped, and a predetermined primary-side abnormality detection signal is sent to the secondary-side control portion through the communication transformer.

7. The insulation-type DC/DC converter according to claim 1, wherein:
   the secondary-side control portion comprises a secondary-side abnormality detection portion for detecting whether predetermined abnormality exists in the secondary-side circuit;
   if the abnormality is detected in the secondary-side circuit, a predetermined secondary-side abnormality detection signal is sent to the primary-side control portion through the communication transformer;
   the primary-side control portion stops switch-driving of the switch transistor upon receiving the secondary-side abnormality detection signal.

8. The insulation-type DC/DC converter according to claim 1, wherein when one control portion of the primary-side control portion and the secondary-side control portion sends a predetermined signal to the other control portion through the communication transformer and the other control portion receives the predetermined signal, the other control portion sends a signal to the one control portion through the communication transformer in response to the predetermined signal received.

9. An AC/DC converter, comprising:
   a rectification circuit, performing full-wave rectification on an AC voltage;
   a smoothing capacitor, smoothing the voltage having undergone full-wave rectification to generate a DC voltage; and
   the insulation-type DC/DC converter of claim 1, thereby generating a DC secondary-side voltage from a primary-side voltage of the DC voltage as an output voltage.

10. A power adaptor, comprising:
   a plug, receiving an AC voltage;
   the AC/DC converter of claim 9; and
   a housing, accommodating the AC/DC converter.

11. An electrical apparatus, comprising:
   the AC/DC converter of claim 9; and
a load device, driven by an output voltage of the AC/DC converter.

* * * * *